(12) United States Patent  
Bremhorst

(10) Patent No.: US 8,151,968 B2  
(45) Date of Patent: Apr. 10, 2012

(54) BELT CONVEYORS AND MINING

(76) Inventor: John Bremhorst, Brisbane (AU)

( * ) Notice: Subject to any disclaimer, the term of this patent is extended or adjusted under 35 U.S.C. 154(b) by 3 days.

(21) Appl. No.: 12/747,387

(22) PCT Filed: Dec. 11, 2008

(86) PCT No.: PCT/AU2008/001826  
§ 371 (c)(1),  
(2), (4) Date: Jul. 20, 2010

(87) PCT Pub. No.: WO2009/073923  
PCT Pub. Date: Jun. 18, 2009

(65) Prior Publication Data  
US 2010/0276258 A1  Nov. 4, 2010

(30) Foreign Application Priority Data

| Dec. 11, 2007 | (AU) | 2007906711 |
| Dec. 20, 2007 | (AU) | 2007906982 |
| May 19, 2008 | (AU) | 2008902454 |
| Jul. 9, 2008 | (AU) | 2008903517 |
| Nov. 24, 2008 | (AU) | 2008906070 |

(51) Int. Cl.  
*B65G 15/26* (2006.01)

(52) U.S. Cl. .................. 198/313; 198/588; 198/812

(58) Field of Classification Search .............. 198/313, 198/588, 812  
See application file for complete search history.

(56) References Cited

U.S. PATENT DOCUMENTS

| 2,576,217 | A | * | 11/1951 | Eggleston ................ 198/313 |
| 3,068,983 | A | * | 12/1962 | McLaughlin ............ 193/35 TE |
| 3,788,452 | A | | 1/1974 | McWilliams |
| 3,835,980 | A | | 9/1974 | Brooks, Jr. |
| 4,312,540 | A | * | 1/1982 | Thompson ................ 198/313 |
| 5,351,809 | A | | 10/1994 | Gilmore et al. |
| 5,366,068 | A | * | 11/1994 | Hall et al. ............... 198/812 |
| 5,685,416 | A | * | 11/1997 | Bonnet ................... 198/812 |
| 5,902,089 | A | | 5/1999 | Sinn et al. |
| 5,938,004 | A | * | 8/1999 | Roberts et al. ........... 198/812 |
| 5,997,101 | A | | 12/1999 | Peterson |
| 6,003,658 | A | * | 12/1999 | Best et al. ............... 198/588 |
| 7,823,715 | B2 | * | 11/2010 | Kinnunen et al. ......... 198/313 |

FOREIGN PATENT DOCUMENTS

WO  2006131587 A1  12/2006

OTHER PUBLICATIONS

John Bremhorst, International Search Report for co-pending Application No. PCT/AU2008/001826 mailed Jan. 23, 2009.

* cited by examiner

*Primary Examiner* — James R Bidwell  
(74) *Attorney, Agent, or Firm* — Ungaretti & Harris LLP

(57) ABSTRACT

An extendable support apparatus for supporting an endless conveyor belt has an extendable frame, and a rest for supporting the conveyor belt relative to the frame. The extendable support apparatus is able to be extended and retracted by respectively extending and retracting the extendable frame while the conveyor belt circulates relative to the extendable support apparatus and while the conveyor belt is supported by the rest.

20 Claims, 21 Drawing Sheets

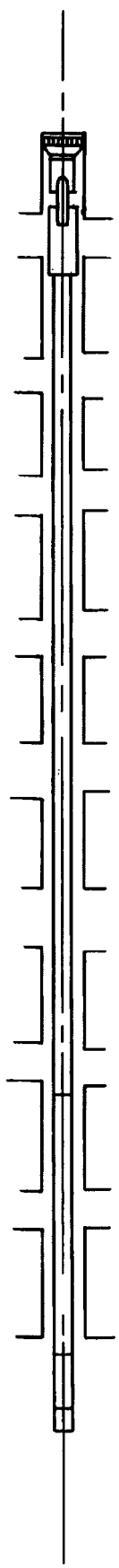
FIGURE 1 – PRIOR ART

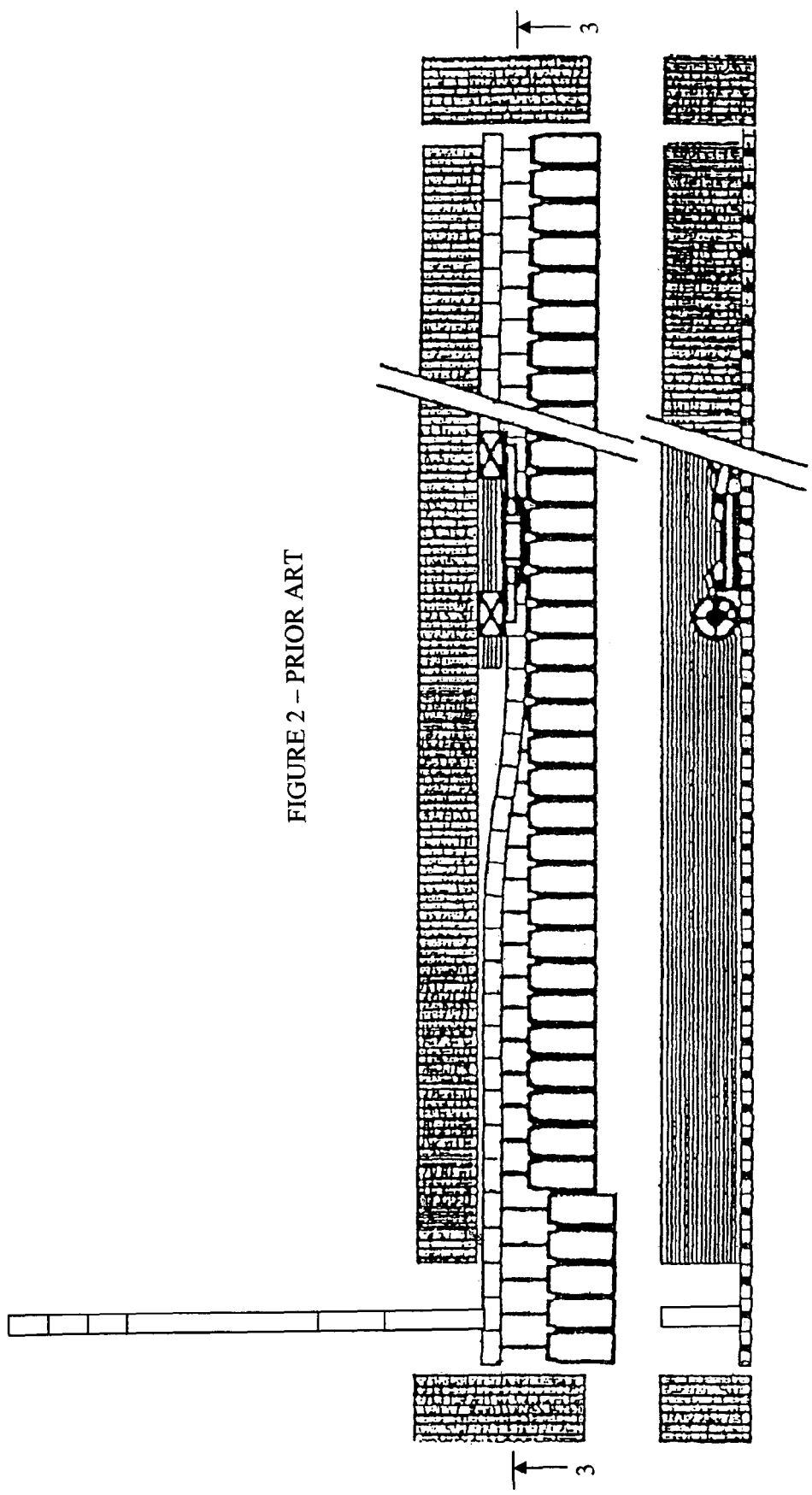
FIGURE 2 – PRIOR ART
FIGURE 3 – PRIOR ART

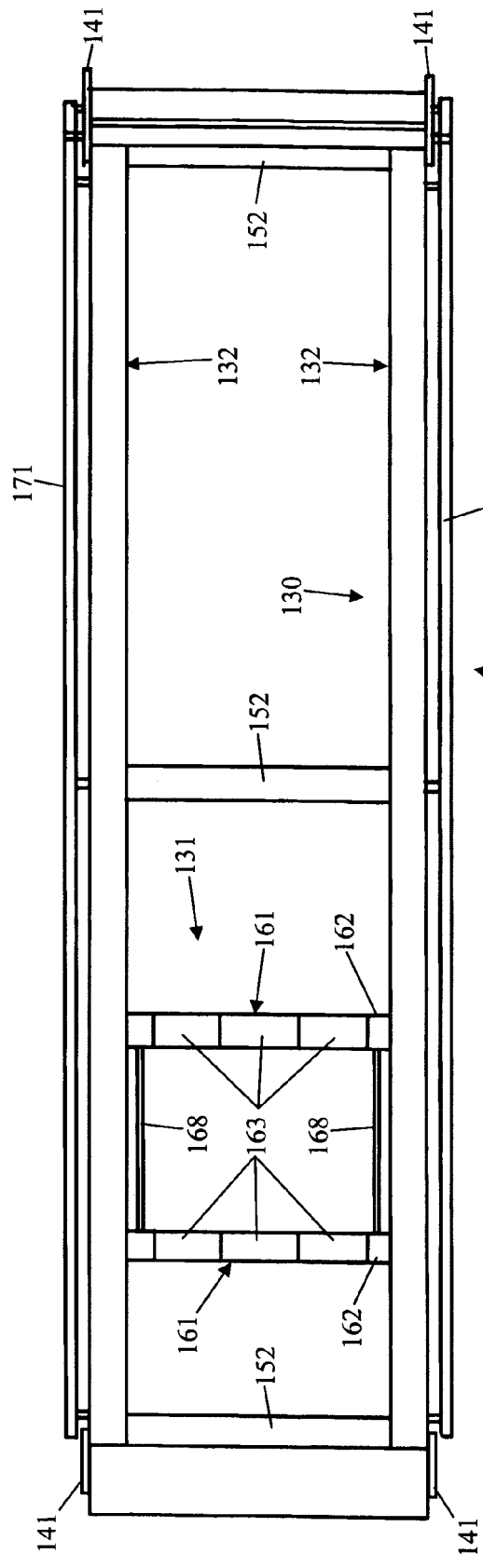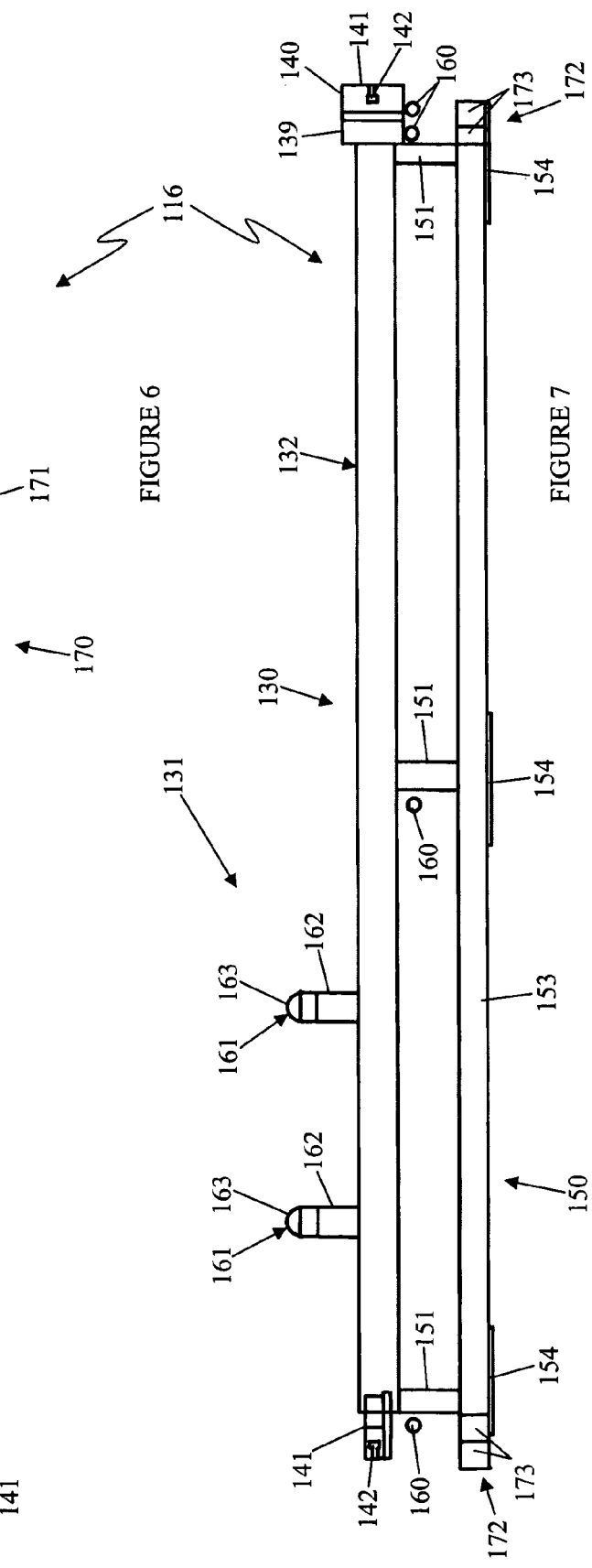
FIGURE 6
FIGURE 7

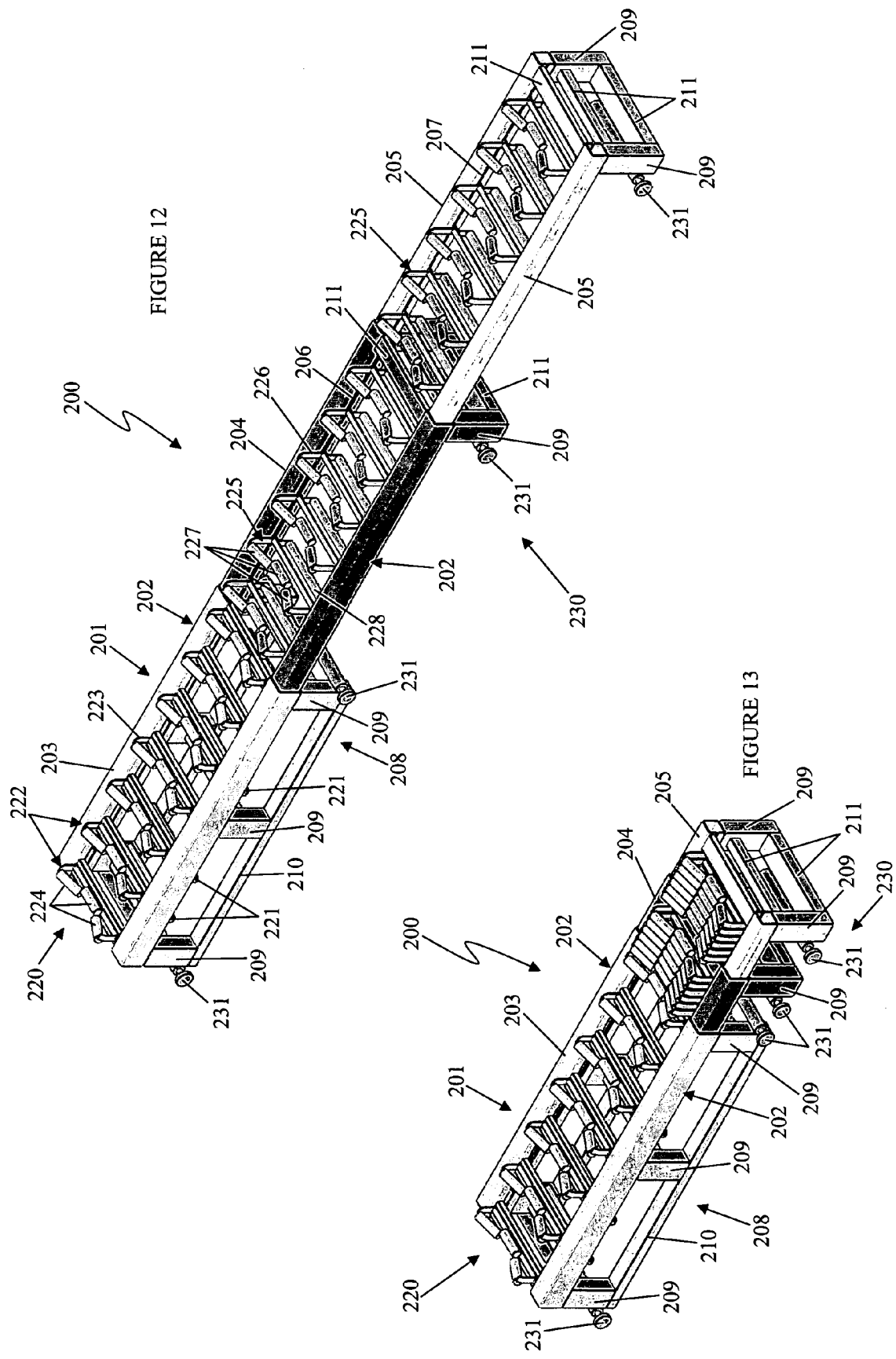

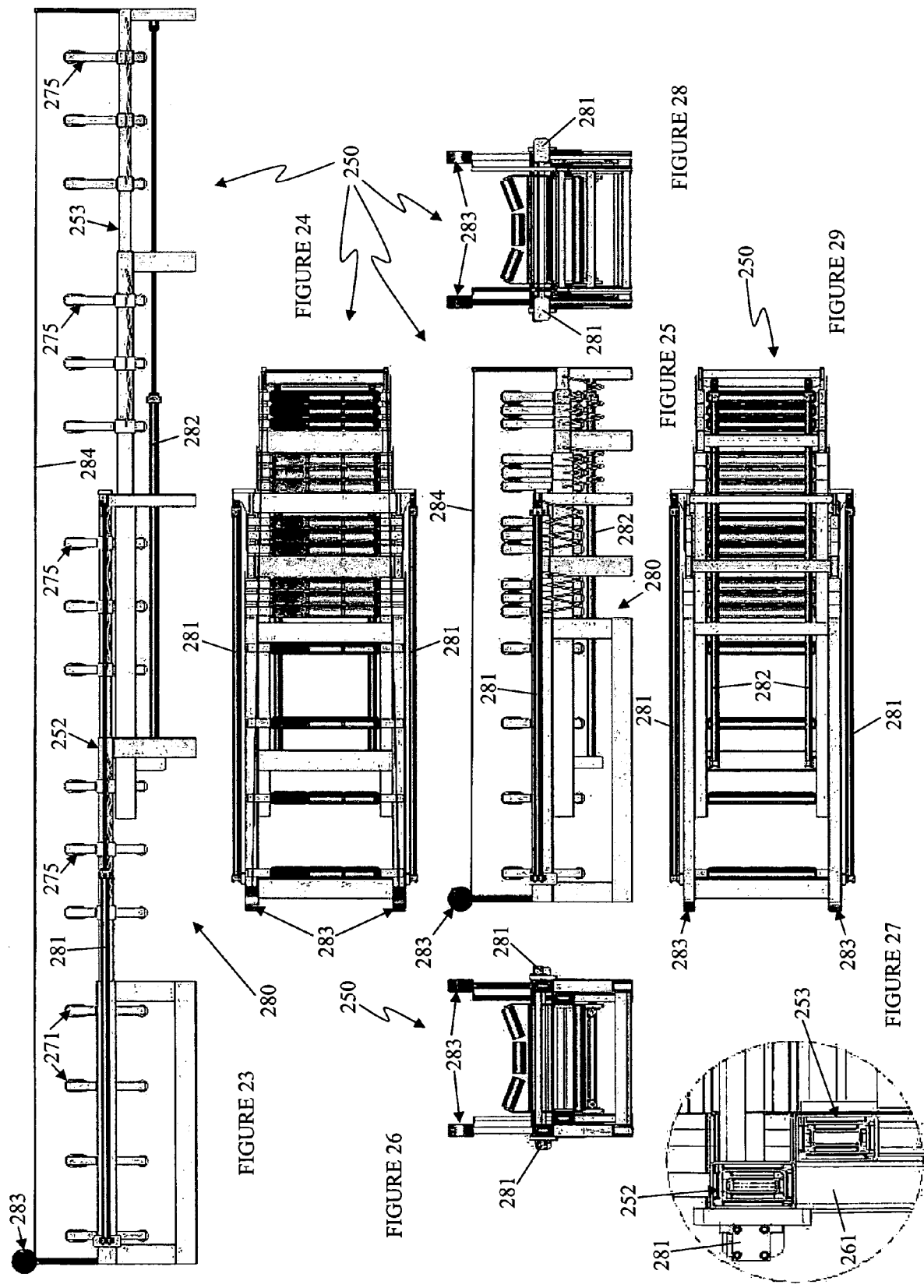

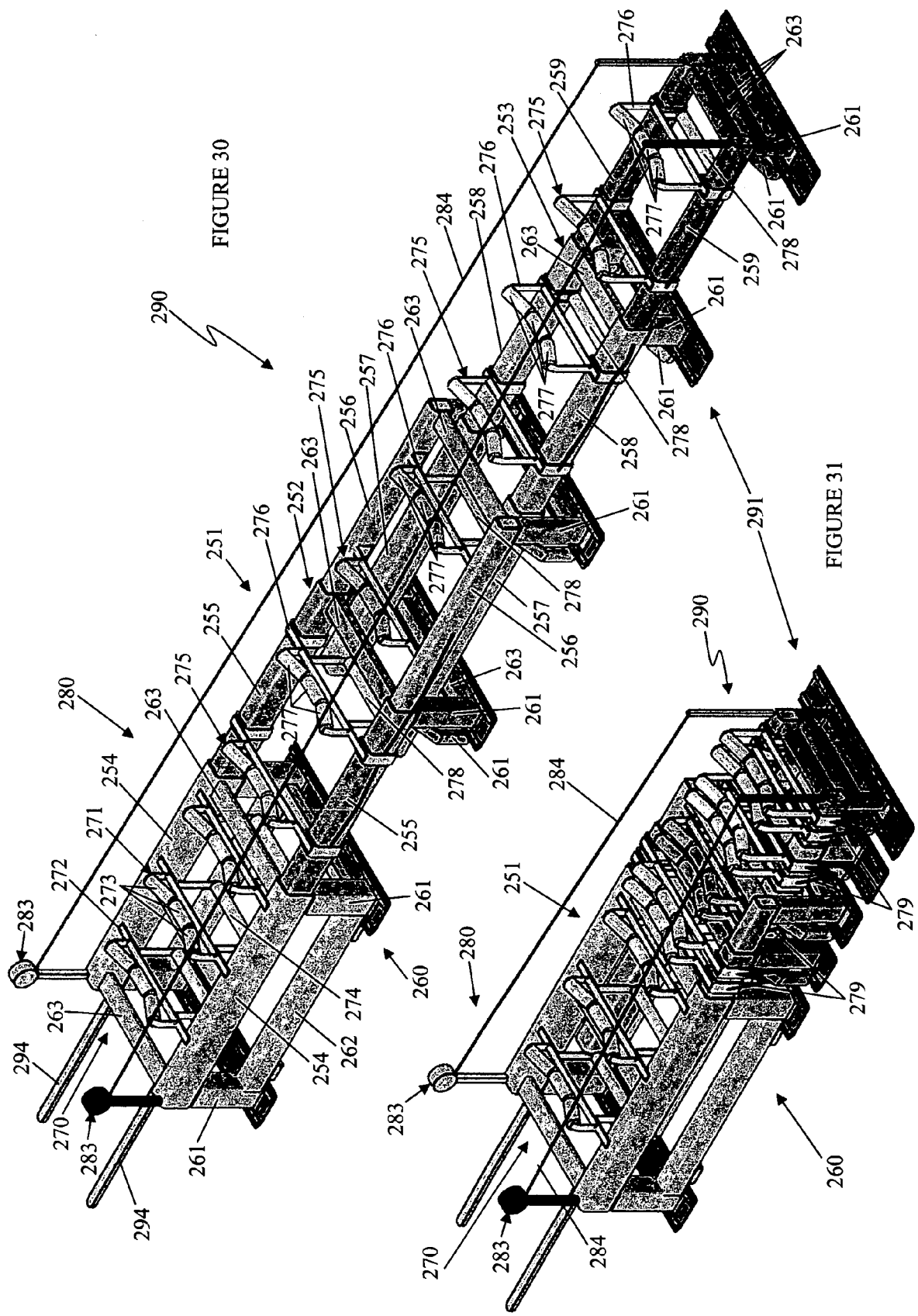

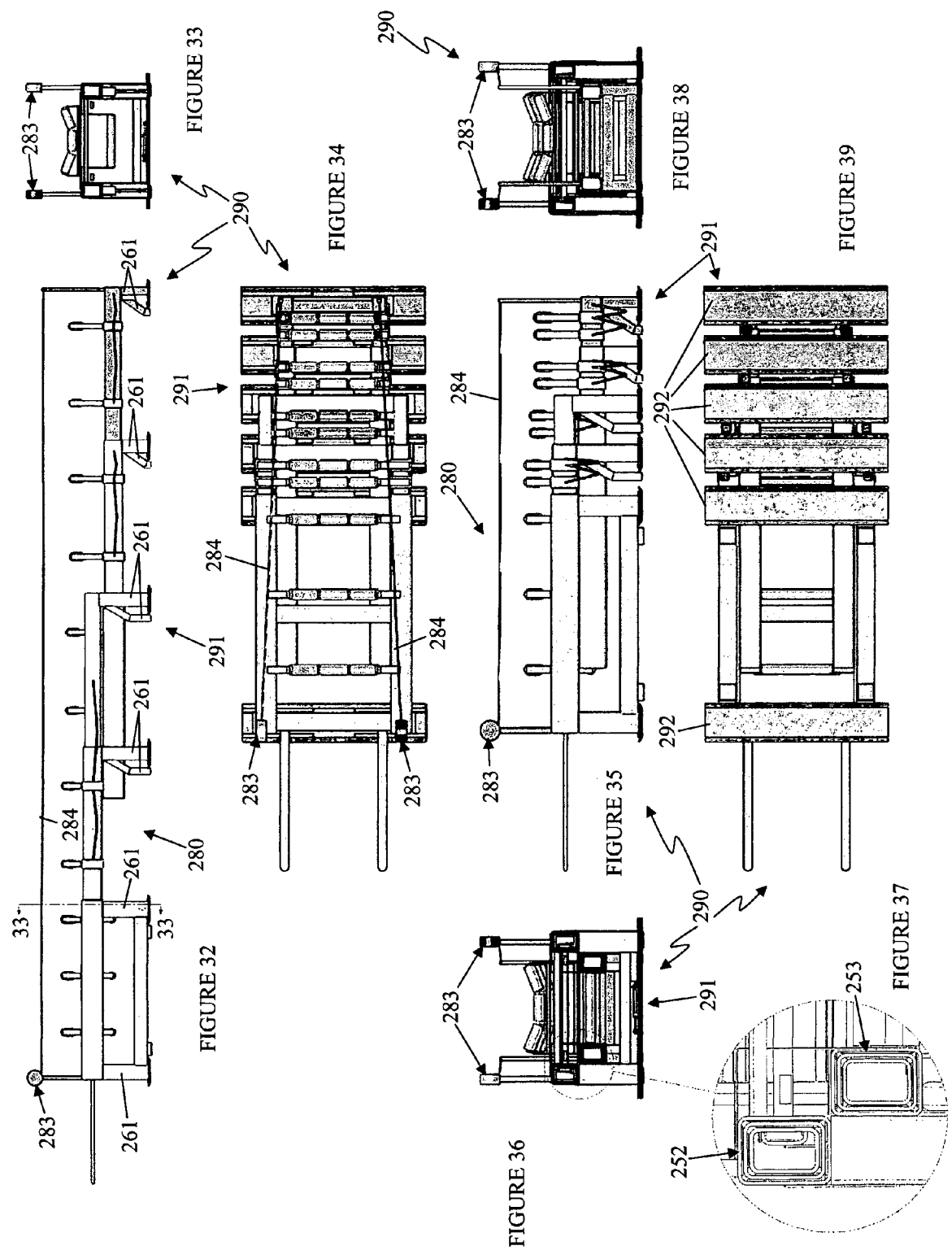

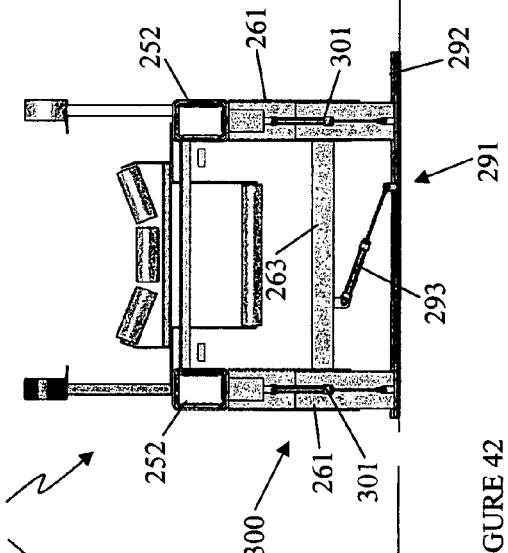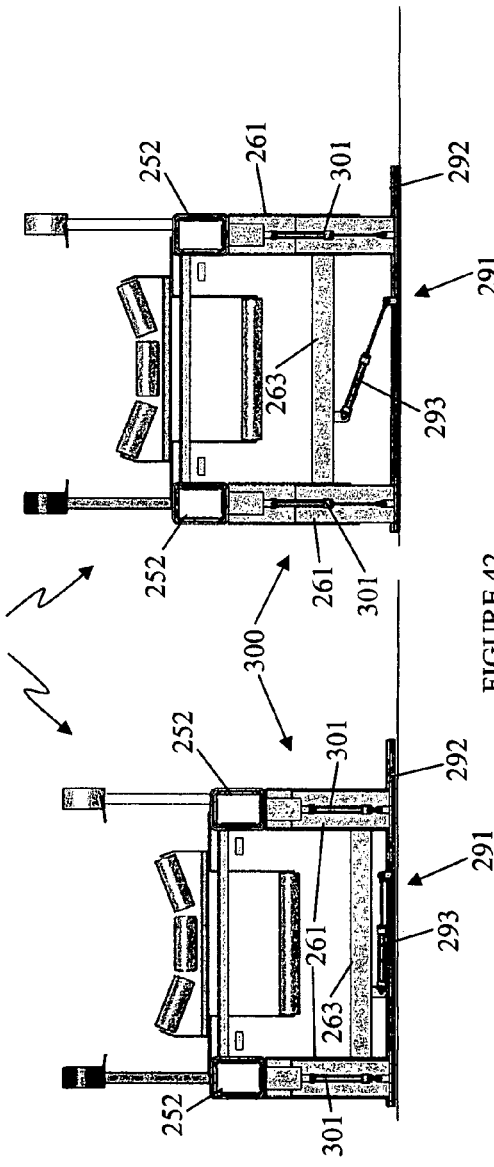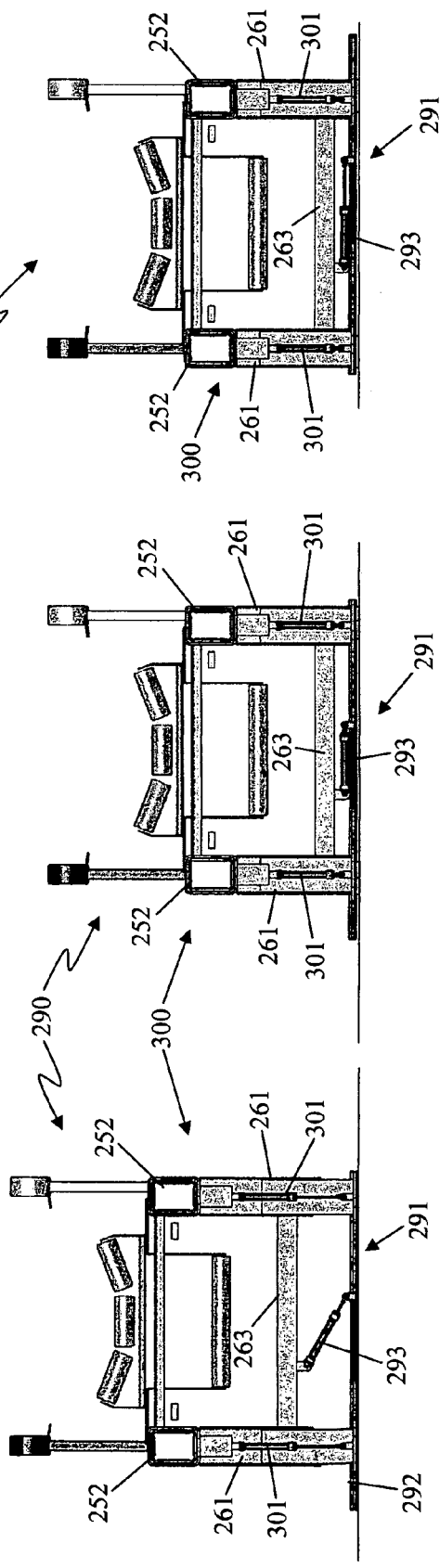

BELT CONVEYORS AND MINING

CROSS-REFERENCE TO RELATED APPLICATIONS

This Application is a U.S. National filing under §371 of International Application No. PCT/AU2008/001826, with an international filing date of Dec. 11, 2008, now pending, claiming priority from Australian Application No. 2007906711, filed Dec. 11, 2007, No. 2007906982, filed Dec. 20, 2007, No. 2008902454, filed May 19, 2008, No. 2008903517 filed Jul. 9, 2008 and No. 2008906070, filed Nov. 24, 2008, now pending, and herein incorporated by reference.

FIELD OF THE INVENTION

The present invention relates generally to material haulage operations which employ extendable belt conveyors to haul material from one location to another.

Although the present invention will be described with particular reference to hauling coal in underground room and pillar coal mines as well as underground longwall coal mines, it will be appreciated that this is by way of example only and that the invention is not necessarily limited to this particular use. For example, the invention may be used in other types of underground mining operations, as well as surface coal mining operations. Also, the invention may be used in surface and underground mining operations which are not coal mining operations. Moreover, the invention may be used in tunneling operations which are not related to the mining industry. More generally, the invention may be used in material transfer operations which are neither mining nor tunneling operations.

BRIEF DISCUSSION OF THE PRIOR ART

Two common mining methods which are used in underground coal mines are room and pillar mining, and longwall mining. In room and pillar mining, a series of interconnected tunnels or development roadways are dug underground along a coal seam in a grid-like arrangement such that large pillars or blocks of coal are left behind to support the roof of the mine. FIG. 1 depicts a development roadway and pillars of a typical underground room and pillar coal mine.

A continuous miner is typically used to develop the roadways in an underground room and pillar coal mine. A continuous miner is depicted at one end of the roadway shown in FIG. 1. A continuous miner is a machine which has a large rotating steel drum that moves up and down. The drum is equipped with teeth that cut coal from the coal face of the development roadway as the drum rotates. As the cut coal falls to the ground, large arms under the drum gather the coal onto a conveyor chain which carries the coal to the back of the machine. The coal may be unloaded at the back of the machine onto a shuttle car or onto a ram car or a flexible conveyor train or other haulage machine which hauls the coal to a belt conveyor which extends along the roadway towards the coal face and which hauls the coal along the roadway to another location. Alternatively, the coal may be unloaded at the back of the machine directly onto a fixed or mobile boot end which is coupled to the belt conveyor. The continuous miner depicted in FIG. 1 unloads coal onto a mobile boot end which is able to follow the continuous miner in close proximity as the continuous miner advances along the development roadway.

In longwall mining, the roof of the underground mine is allowed to collapse in a planned sequence. A mechanical miner called a longwall machine is used to mine the coal in longwall coal mines. FIGS. 2 and 3 depict a typical underground longwall coal mine as well as a typical longwall machine. The longwall machine has large chocks or shields that support the roof of the mine and protect the miners during mining. A rotating drum, called a shearer, cuts coal from the coal face as it traverses across the coal face. As more of the coal is cut, the machine moves forward or backwards relative to an adjacent roadway, depending upon the orientation of the longwall machine relative to the roadway. The orientation of the longwall machine depicted in FIGS. 2 and 3 is such that the machine moves backwards or forwards relative to the adjacent roadway. The roof behind the machine falls in a planned order as the machine moves.

The coal which is cut by the shearer drops onto a conveyor of the longwall machine and is transferred by the conveyor to a beam stage loader arrangement. The coal is transferred by the beam stage loader onto a fixed or mobile boot end which is coupled to a belt conveyor which extends along the roadway towards the coal face. The belt conveyor in turn hauls the coal along the roadway to another location. The beam stage loader which transfers coal from the conveyor of the longwall machine depicted in FIGS. 2 and 3, transfers coal onto a mobile boot end which is able to follow the longwall machine in close proximity as the machine retreats or advances along a roadway.

Belt conveyors such as the ones depicted in FIGS. 1 and 2, are extended or retracted along the mined roadway cavity at periodic intervals. Such conveyors typically include a loop take-up, a jib and a drive head. The loop take-up extends and retracts the conveyor belt of the conveyor as the conveyor is respectively extended and retracted along the roadway. The jib, which is located at an opposite end of the conveyor to the boot end, is typically used to deposit the coal onto a heap to await further processing or transportation. The drive head, which is located between the jib and the loop take-up in FIG. 2, circulates the conveyor belt of the conveyor.

As the fixed or mobile boot end moves along the roadway, the belt conveyor must be lengthened or shortened as appropriate. The conveyor is typically rendered inoperable during the extension and retraction process causing coal mine production from the development roadway or longwall to cease or slow.

It is a disadvantage of current belt conveyors that the mining operation must cease when the conveyor is extended or retracted. Some prior art conveyors allow for limited extension or retraction of the conveyor during its construction, however they all prevent vehicular access to the coal face, roadway, coal face equipment, continuous miner and longwall machine once the conveyor has been constructed up to or near the coal face. In addition, they present risks to the safety of operators who work in their vicinity. Furthermore, they do not allow for continuous mining because each time the conveyor needs to be extended or retracted, the conveyor has to be shutdown for a period of time in order to allow the length of the conveyor to be modified. Moreover, they do not allow for ease of installing secondary ground and roof support in the mine. They also do not facilitate for all or even a substantial part of the belt conveyor components which are required in order to extend the conveyor by the necessary length and up to one pillar of length up to 250 m to be transported to the coal face without the need for restocking of the components at regular intervals, causing production to cease each time. Similarly, they do not facilitate for all or even a substantial part of the roadway roof and rib support components which are required to develop the roadway by the length of one pillar to be transported to the coal face without the need for restocking of the components at regular intervals, again causing production to cease each time.

SUMMARY OF THE INVENTION

It is an object of the present invention to overcome, or at least ameliorate, one or more of the deficiencies of the prior art mentioned above, or to provide the consumer with a useful or commercial choice.

Other objects and advantages of the present invention will become apparent from the following description, taken in connection with the accompanying drawings, wherein, by way of illustration and example, a preferred embodiment of the present invention is disclosed.

According to a first broad aspect of the present invention there is provided an extendable support apparatus for supporting an endless conveyor belt, the apparatus comprising an extendable frame, and a rest for supporting the conveyor belt relative to the frame, the apparatus is able to be extended and retracted by respectively extending and retracting the frame while the conveyor belt circulates relative to the apparatus and while the conveyor belt is supported by the rest.

The extendable support apparatus allows the conveyor belt to continuously haul material even while the extendable support apparatus is being extended or retracted.

Preferably, the extendable frame includes at least one telescopic rail which includes a plurality of segments which are able to be extended and retracted relative to each other. The segments are preferably nested segments. In one particular preferred form, the extendable frame includes a single pair of telescopic rails. In another particular preferred form, the frame includes a first pair of telescopic rails, and a second pair of telescopic rails which are secured relative to the first pair of telescopic rails.

Each telescopic rail may include any suitable number of segments. It is preferred that each telescopic rail includes three segments. In particular, it is preferred that each telescopic rail includes a first segment, a second segment received by the first segment, and a third segment received by the second segment.

One or more of the segments of each of the telescopic rails may be in the form of a truss structure. The selection of a truss structure for one or more of the segments may be dependent on the load which the telescopic rail is to be subjected to.

In order to inhibit misalignment of the extendable support apparatus with the conveyor belt which it supports, it is preferred that the individual segments of each telescopic rail are always substantially aligned with each other so that each telescopic rail is always substantially straight. This is preferably achieved by overlapping the segments of each telescopic rail by a sufficient amount. Preferably, the segments of each telescopic rail overlap each other by at least approximately 20 percent of their length.

Preferably, the extendable support apparatus also includes at least one respective joining member at one or both ends of the extendable frame so as to facilitate joining the apparatus in series with one or more other apparatus which may or may not also be extendable support apparatus. Where the extendable frame includes one or more telescopic rails, it is preferred that there is a respective one of the joining members at each end of each telescopic rail. The joining members may be of any suitable type, however it is preferred that the joining members are of a type which is able to be used to form an articulated joint between the extendable support apparatus and the other apparatus which the extendable support apparatus is joined to. Preferably, each of the joining members includes a socket for receiving a linkage.

It will be understood that the length as well as the profile dimensions of the individual segments of each telescopic rail can be selected so that the telescopic rail has the required load capacity and reach.

Each segment of each telescopic rail is preferably made from at least one sheet of material. Preferably, each segment is shaped from a single sheet of material. The sheet of material may be shaped in any suitable manner. Of the many ways in which the sheet of material may be shaped, folding, bending, rolling, and any combination thereof, may be employed, for example.

The segments of each telescopic rail may be made from any suitable material. The material from which the segments are made preferably has sufficient strength and rigidity to endure the loads applied to the telescopic rails. For example, each segment may be made from a suitable metal, plastic, expanded metal or composite material.

Preferably, there is nylon, Teflon, polyurethane or one or more other suitable friction-reducing materials between the segments of each telescopic rail so that friction between the segments is reduced. Alternatively, or in addition to a suitable friction-reducing material, each telescopic rail may include one or more friction-reducing rollers or bearings between the segments.

It is preferred that the extendable frame also includes a base which supports each telescopic rail. The base may be secured to one or more of the segments of each telescopic rail. The base preferably includes a plurality of leg members. The base may also include one or more longitudinal members extending between at least some of the leg members. The base may also include one or more lateral members extending between at least some of the leg members.

The extendable support apparatus preferably also includes length-adjusting means which is operable to extend or retract the extendable frame of the apparatus. The length-adjusting means may for example include one or more towing ropes, winches and ropes, extendable hydraulic or pneumatic cylinders, skids, pads, wheels, tracks or jacks which are operable to extend or retract the extendable frame. The skids, wheels, tracks or pads may be steerable. The length-adjusting means is preferably able to extend or retract each segment of each telescopic rail in a successive manner such that if a first segment of each telescopic rail is being extended or retracted, a second segment of each telescopic rail which is adjacent to the first segment will not generally begin to be extended or retracted by the length-adjusting means until the first segment has been fully extended.

The length-adjusting means may be a powered mechanism. For example, the length-adjusting means may be hydraulically, pneumatically or electrically powered. The extendable support apparatus may be equipped with its own power source for powering the length-adjusting means. Alternatively, the length-adjusting means may be powered by an external power source which is not part of the extendable support apparatus. For example, the length-adjusting means may be powered by a hydraulic or electric power source which belongs to a mobile boot end.

The extendable support apparatus preferably includes a controller for controlling the length-adjusting means. The controller may be a manual controller so that an operator is able to manually control the length-adjusting means, or it may be an automated controller which may include a computer or a programmable logic controller, for example. The automated controller is preferably able to control the length-adjusting means such that the length-adjusting means is able to cause the extendable support apparatus to move in a particular direction at a controlled velocity and in a predetermined fashion. For example, if the extendable support apparatus is being used in an underground coal mine, the automated controller may control the length-adjusting means such that the length-adjusting means is able to cause the extendable support apparatus to move towards a coal face of the mine.

Preferably, the extendable support apparatus also includes a height-adjusting means which is operable to raise and lower the extendable frame. The height-adjusting means is preferably operable to keep each telescopic rail substantially level even when the ground on which the extendable support apparatus rests is uneven or has a gradient. The height-adjusting means preferably includes a plurality of extendable cylinders for raising or lowering each telescopic rail. The cylinders are preferably mounted in or adjacent to the leg members of the base. The cylinders may be any suitable type of extendable cylinders. For example, the cylinders may be hydraulic or pneumatic cylinders.

It is preferred that the extendable support apparatus also includes a shifting means which is operable to shift the apparatus laterally. The inclusion of the shifting means is particularly advantageous if for example the extendable support apparatus is situated in a roadway of an underground mine, and the apparatus needs to be shifted to one side to make room for a vehicle to pass beside the apparatus, or to provide access to coal face equipment. The shifting means may, for example, comprise one or more extendable arms, extendable cylinders, pads, tracks or wheels which are operable to shift the apparatus laterally.

The automatic controller is preferably able to control the height adjusting means and shifting means.

The extendable support apparatus may also include one or more roof contact jacks for fixing the apparatus between a floor and a roof of a development roadway in an underground mine.

Preferably, the rest for supporting the conveyor belt includes a plurality of idlers or skid bars. Each idler or skid bar may be fixed or translatable relative to the extendable frame. The translatable idlers may be joined serially by one or more connecting links which are also affixed to the extendable frame. The connecting links are preferably comprised of straps however they may alternatively be comprised of chain, wire rope, carbon fibre, telescoping steel section or any other suitable type of link. The connecting links are preferably affixed at either end of the apparatus. The connecting links preferably draw the translatable idlers along the extendable frame. The rest preferably also includes a plurality of idler support frames which are mounted on the extendable frame, and the translatable idlers are mounted on the idler support frames. The idler support frames may be commonly available idler support frames. The idler support frames may be incorporated and installed into translatable idler collars which are carried by the extendable frame. Nylon, teflon, polyurethane or another friction-reducing material, or rollers, bearings or a combination of each may be situated between the idler support frames and the extendable frame so as to reduce friction between the idler support frames and the extendable frame.

The rest of the extendable support apparatus preferably includes return idlers which are preferably of flat or vee'd construction. The return idlers may be fixed at intervals to the base, or they may be attached to an extendable structure which moves relative to the extension of the extendable support apparatus.

The telescopic rails may be of varied design and common to each segment one mating profile translational idler to translate along the retracted or extended length of each telescopic rail length. The segments may be provided with collars. A recessed arrangement may be substituted for enclosed collars that are translatable along the length of each telescopic rail and to which the translatable idlers may be affixed.

The extendable support apparatus may be made from any suitable material or combination of materials. For example, the extendable support apparatus may be made from a combination of steel, carbon fibre, composite material, plastic-based materials and motivational components.

The extendable support apparatus may operate with a variety of conveyor belt widths and types, its width being variable to suit the width of the applied conveyor belt.

The extendable support apparatus may be transported by towing or on forks. This allows the extendable support apparatus to be installed in a development roadway of an underground mine in a fast, convenient, safe and simple manner. The modular design allows the apparatus to be quickly and easily removed, stored and transported away from the development roadway upon cessation of the roadway development.

According to a second broad aspect of the present invention there is provided a continuous haulage apparatus comprising at least one of the extendable support apparatus, an endless conveyor belt supported by each support apparatus, a drive for circulating the conveyor belt relative to each support apparatus, and a loop take-up for extending and retracting the conveyor belt in response to the at least one support apparatus being respectively extended and retracted.

The continuous haulage apparatus is able to continuously haul material on the conveyor belt even while the extendable support apparatus is being extended or retracted.

The continuous haulage apparatus may include any number of extendable support apparatus. Preferably, the continuous haulage apparatus includes a plurality of the extendable support apparatus arranged in series. The number of extendable support apparatus can be varied at will to suit the requirements of the application (e.g. underground mine haulage) in which it is being employed.

The continuous haulage apparatus preferably also includes a belt conveyor which includes the conveyor belt. The belt conveyor is preferably an extendable belt conveyor which is able to be extended and retracted. If the belt conveyor is an extendable belt conveyor, it is preferred that the continuous haulage apparatus also includes a belt structure building, installation and extension station, a belt structure retraction station, or a conveyor assembly station for extending or retracting the belt conveyor. Preferably, one end of the extendable support apparatus is secured to the station.

It is preferred that the belt structure building, installation and extension station, and the belt structure retraction station include a conveyor belt lifter apparatus which is constructed so that one end of the lifter apparatus may be pivoted, and so that the other end of the lifter apparatus is able to be actuated vertically to support the weight of the conveyor belt. The carry side of the conveyor belt is preferably contained and isolated in a segregated structure of the station. The return side of the conveyor belt is preferably contained and isolated in a guard sheath. Preferably, the station sheaths both the carry and return side of the conveyor belt such that no moving parts are exposed at the station. An alternative construction is the application of a tripper structure that is able to support the conveyor belt by a series of rollers which in turn are able to support the weight of the conveyor belt and divert the belt around a working area.

The continuous haulage apparatus may also include a fixed boot end or a mobile boot end located adjacent to the extendable support apparatus. If the continuous haulage apparatus includes a mobile boot end, it is preferred that the apparatus also includes one or more articulated attachment links which extend between the mobile boot end and the extendable support apparatus which is located adjacent to the mobile boot end. This enables the mobile boot end to draw the extendable support apparatus behind it as the mobile boot end moves for example towards a coal face synchronously with a continuous miner or the like.

The extendable supports are preferably connected to each other by articulated joints. The extendable supports may also be connected to the belt structure building, installation and extension station, belt structure retraction station, or the conveyor assembly station by an articulated joint.

The extendable support apparatus is preferably able to provide for the carriage of a full pillar quantity of (i) conveyor belt structure and idlers; and (ii) roadway roof and rib support materials. The continuous haulage apparatus preferably includes one or more materials handling devices which may be situated on a main frame or the belt structure building, installation and extension station that enables the conveyor belt structure and idlers, and the roadway roof and rib support materials to be mechanically motivated to various locations on the continuous haulage apparatus.

Roof and rib support materials may be carried with a continuous miner, a mobile boot end, or the extendable support apparatus. Conveyor components may be arranged, stored and carried on the extendable support apparatus and at a belt structure building, installation and extension station or a belt structure retraction station. The extendable support apparatus is preferably capable of carrying roof and rib support materials, ventilation components and fire suppression components in cassettes mounted on it.

Preferably, the extendable support apparatus incorporates a monitoring device to detect for relative movement between a mobile boot end and a belt structure building, installation and extension station, or a belt structure retraction station.

An alignment device may be fitted to a mobile boot end and the extendable support apparatus. Where the extendable support apparatus is used in conjunction with a conveyor assembly station, the alignment device preferably also accounts for the conveyor assembly station. Data from the alignment device may be broadcast to an external website.

Extension or retraction of the extendable support apparatus may be achieved by various material means, including winch and rope, a mobile boot end, an external machine such as a loader, a conveyor assembly station, or belt building or retraction station. The conveyor assembly station or belt building or retraction station may be motivated towards a mobile boot end such that the extendable support apparatus is retracted.

According to a third broad aspect of the present invention there is provided a mining apparatus comprising a mining machine for mining material, and the continuous haulage apparatus for hauling the mined material.

Material which is mined by the mining machine is able to be continuously hauled by the continuous haulage apparatus even while the extendable support apparatus of the continuous haulage apparatus is being extended or retracted.

It is preferred that the mining apparatus is a coal mining apparatus.

The mining machine may for example be a continuous miner or a longwall machine.

Optionally, a shuttle car or a ram car or other haulage device may be employed to transfer material from the mining machine to the continuous haulage apparatus.

According to a fourth broad aspect of the present invention there is provided a continuous haulage apparatus comprising at least one of the extendable support apparatus, and a belt conveyor extension or retraction station for use with the extendable support apparatus.

The present invention, where necessary, is constructed to operate in explosion risk environments as necessary.

The extendable support apparatus according to the first aspect of the present invention is particularly suitable for providing an improved method of conveying coal from underground coal mine development roadways between a continuous miner or a longwall machine that cuts coal at a coal face, and a conveyor which conveys coal out of a roadway. These two items of equipment can sometimes be hundreds of meters away from each other. The extendable support apparatus is simple, cost effective, reliable, and facilitates continual coal production by removing the need in current coal mining practice to stop development production to build, install and extend or retract the conveyor structure to a position closer to the continuous miner or longwall machine, situated at the coal face. Either a fixed or a mobile boot end or other haulage device may be used in conjunction with the extendable support apparatus although the preferred method is to use the extendable support apparatus in conjunction with a mobile boot end of one form or another. The mobile boot end or other haulage device can follow the continuous miner in close proximity.

The extendable support apparatus may be employed separately to the belt structure building, installation and extension station as necessary.

BRIEF DESCRIPTION OF THE DRAWINGS

In order that the invention may be more fully understood and put into practice, a preferred embodiment thereof will now be described with reference to the accompanying drawings, in which:

FIG. 1 is a plan view of a development roadway of an underground room and pillar coal mine and a prior art mining apparatus which extends along the roadway;

FIG. 2 is a plan view of an underground longwall coal mine and a prior art mining apparatus;

FIG. 3 is a cross-sectional end elevation of the prior art mining apparatus depicted in FIG. 2 taken along the line 3-3.

FIG. 6 is a plan view of a first preferred embodiment of an extendable support apparatus according to the first aspect of the present invention;

FIG. 7 is a side elevation of the extendable support apparatus depicted in FIG. 6;

FIG. 12 is a perspective view of a second preferred embodiment of an extendable support apparatus according to the first aspect of the present invention when the apparatus is fully extended;

FIG. 13 is a perspective view of the extendable support apparatus depicted in FIG. 12 when the apparatus is fully retracted;

FIG. 23 is a side elevation of the extendable support apparatus depicted in FIG. 21;

FIG. 24 is a plan view of the extendable support apparatus depicted in FIG. 22;

FIG. 25 is a side elevation of the extendable support apparatus depicted in FIG. 24;

FIG. 26 is a left-hand end elevation of the extendable support apparatus depicted in FIG. 25;

FIG. 27 is an enlarged view of a portion of the extendable support apparatus depicted in FIG. 26;

FIG. 28 is a right-hand end elevation of the extendable support apparatus depicted in FIG. 22;

FIG. 29 is an inverted plan view of the extendable support apparatus depicted in FIG. 22;

FIG. 30 is a perspective view of a fourth preferred embodiment of an extendable support apparatus according to the first aspect of the present invention when the apparatus is fully extended;

FIG. 31 is a perspective view of the extendable support apparatus depicted in FIG. 30 when the apparatus is fully retracted;

FIG. 32 is a side elevation of the extendable support apparatus depicted in FIG. 30;

FIG. 33 is a cross-sectional end elevation of the extendable support apparatus depicted in FIG. 32 taken along the line 33-33;

FIG. 34 is a plan view of the extendable support apparatus depicted in FIG. 31;

FIG. 35 is a side elevation of the extendable support apparatus depicted in FIG. 34;

FIG. 36 is a left-hand end elevation of the extendable support apparatus depicted in FIG. 35;

FIG. 37 is an enlarged view of a portion of the extendable support apparatus depicted in FIG. 36;

FIG. 38 is a right-hand end elevation of the extendable support apparatus depicted in FIG. 35;

FIG. 39 is an inverted plan view of the extendable support apparatus depicted in FIG. 35;

FIG. 40 is an enlarged view of FIG. 33 which depicts the extendable support apparatus before it is raised and shifted sideways;

FIG. 41 depicts the extendable support apparatus illustrated in FIG. 40 after being raised;

FIG. 42 depicts the extendable support apparatus illustrated in FIG. 41 after being shifted sideways;

FIG. 43 depicts the extendable support apparatus illustrated in FIG. 42 after being lowered;

FIG. 44 depicts the extendable support apparatus illustrated in FIG. 43 after being shifted sideways back to its original position;

DETAILED DESCRIPTION OF THE DRAWINGS

Figure 4:
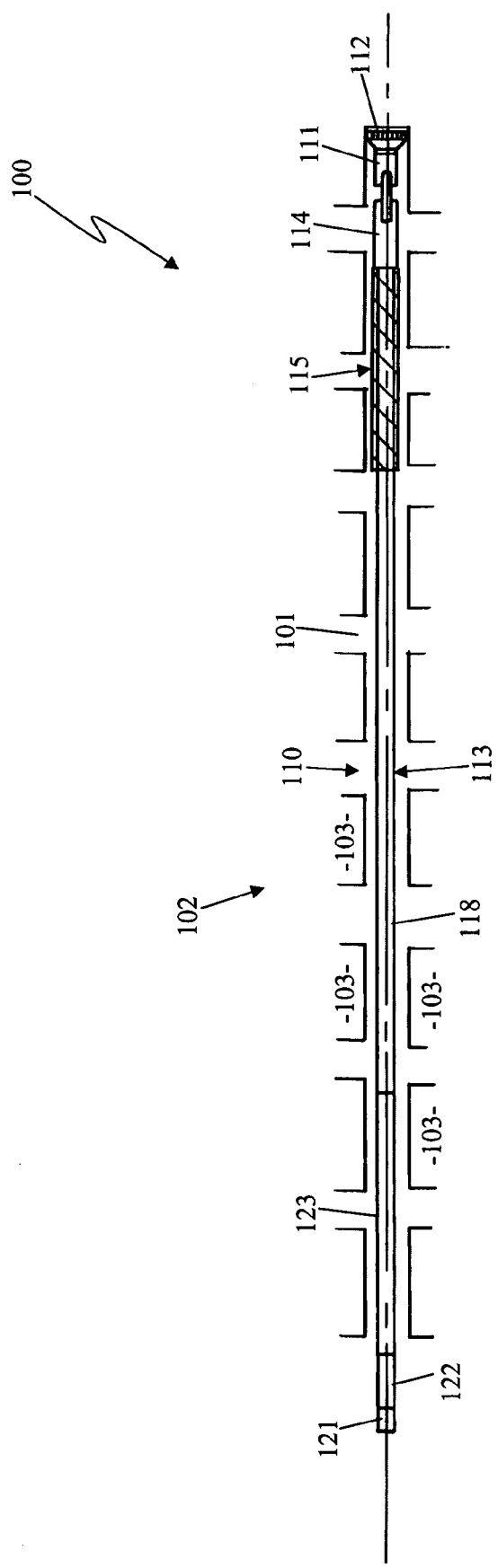
FIG. 4 is a plan view of a development roadway of an underground room and pillar coal mine or longwall gate road and a first preferred embodiment of a mining apparatus according to the third aspect of the present invention which extends along the roadway.

Referring to FIG. 4, an underground room and pillar coal mine 100 includes a series of roadways 101 which are dug underground along a coal seam 102 in a grid-like arrangement such that large pillars or blocks 103 are left behind to support the roof of the mine 100.

A mining apparatus 110 extends along a particular one of the roadways 101 which is being developed. Mining apparatus 110 includes a continuous miner 111 which is located adjacent to a coal face 112 of the mine 100, and a continuous haulage apparatus 113. The continuous miner 111 is operable to cut coal from the coal face 112 and to transfer the coal to the continuous haulage apparatus 113 which then hauls the coal to another location which is remote from the continuous miner 111.

The continuous haulage apparatus 113 includes a mobile boot end 114 which follows in close proximity to the continuous miner 111 as the continuous miner 111 moves forward along the roadway 101.

The continuous haulage apparatus 113 also includes a series 115 of extendable support apparatus 116 (see FIG. 5) which extends rearward from the mobile boot end 114. The extendable support apparatus 116 which is located closest to the mobile boot end 114 is coupled to the mobile boot end 114 by an articulated linkage 117 (see FIG. 5) so that as the mobile boot end 114 moves towards and away from the coal face 112, at least one the extendable support apparatus 116 is respectively extended and retracted.

In addition, the continuous haulage apparatus 113 includes an extendable belt conveyor 118, and a belt structure building, installation and extension station 119 for extending the length of the belt conveyor 118 is connected to the extendable support apparatus 116 which is closest to the station 119 by an articulated joint 120 so that the station 119 is able to pivot laterally relative to that particular support apparatus 116. Each of the support apparatus 116 in the series 115 is connected to an adjacent support apparatus 116 by a respective articulated joint 120 so that they are able to pivot laterally relative to each other.

Belt conveyor 118 includes an endless conveyor belt which is supported by each extendable support apparatus 116. It also includes a jib 121, a drive 122 for circulating the conveyor belt, and a loop take-up 123 for extending and retracting the conveyor belt in response to extension and retraction of the extendable support apparatus 116 and conveyor 118.

Referring to FIGS. 6 and 7, each extendable support apparatus 116 includes an extendable frame 130 and a rest 131 for supporting the conveyor belt relative to the frame 130. The support apparatus 116 is able to be extended and retracted by respectively extending and retracting the frame 130 while the conveyor belt of the continuous haulage apparatus 113 circulates relative to the apparatus 113 and the support apparatus 116, and while the conveyor belt is support by the rest 131. In this way, the extendable support apparatus 116 allows the continuous haulage apparatus 113 to continuously haul coal which is mined by the continuous miner 112 even while one or more of the extendable support apparatus 116 is/are being extended or retracted in response to movement of the mobile boot end or the station 119.

Figure 8:
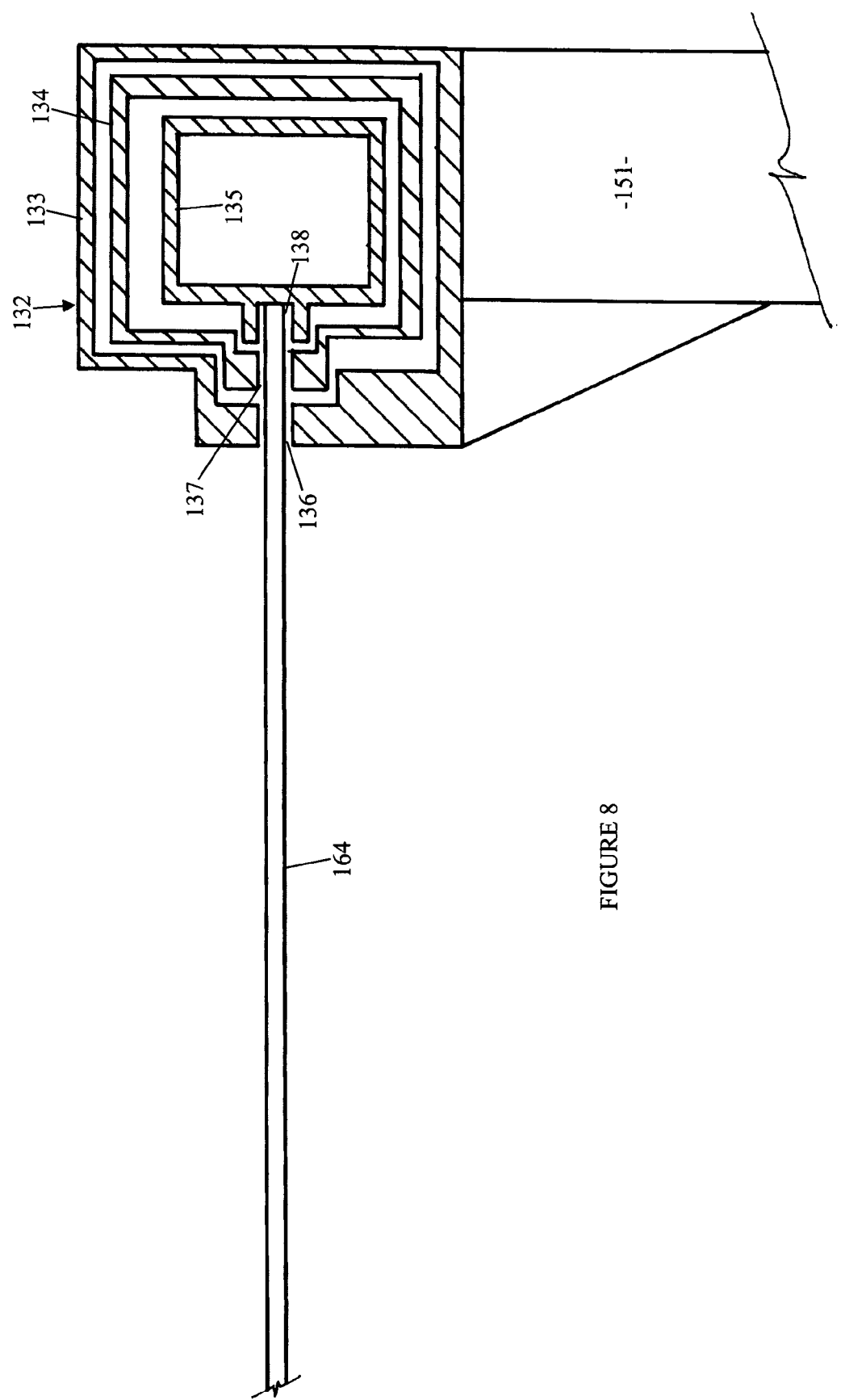
FIG. 8 is a cross-sectional end elevation of a telescopic rail of the extendable support apparatus depicted in FIGS. 6 and 7.

The extendable frame 130 includes a pair of laterally separated telescopic rails 132. With reference to FIG. 8, each rail 132 includes a first hollow segment 133, a second hollow segment 134, and a third hollow segment 135. The second segment 134 is received by the first segment 133 and is able to be extended and retracted relative to the first segment 133. The third segment 135 is received by the second segment 134 and is able to be extended and retracted relative to the third segment 135. The first segment 133 includes an elongate opening 136 which extends the length of the first segment 133. The second segment 134 includes an elongate opening 137 which extends the length of the second segment 134. The third segment 135 includes a channel 138 which extends the length of the third segment 135. The elongate openings 136, 137 and the channel 138 are aligned with each other.

Referring back to FIGS. 6 and 7, one end of the second segment 134 includes a collar 139, and one end of the third segment 135 includes a collar 140. A respective joint member 141 is secured to each end of each rail 132. Each joint member 141 includes a socket 142.

The extendable frame 130 also includes a base 150 which supports the telescopic rails 132. Base 150 includes a plurality of leg members 151 secured to the first segment 133 of each telescopic rail 132, a plurality of lateral members 152, and a plurality of longitudinal members 153. A plurality of skids or pads 154 are secured to the longitudinal members 153.

Rest 131 includes a plurality of rotatable return idler rollers 160 which are secured relative to the base 150 at spaced locations along the base 150. The return idler rollers 160 function to support the return-side of the conveyor belt.

Rest 131 also includes a plurality of idler assemblies 161 for supporting the carry-side of the conveyor belt. Each idler assembly 161 includes an idler support frame 162, and a plurality of rotatable idler rollers 163 supported by the frame 162.

Figure 9:
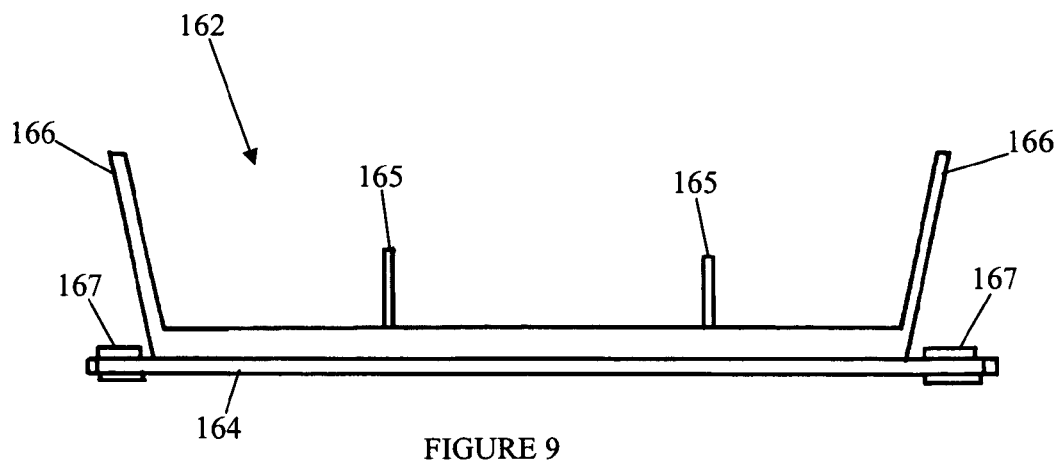
FIG. 9 is a front elevation of an idler support frame of the extendable support apparatus depicted in FIGS. 6 and 7.

Referring to FIG. 9, the idler support frame 162 includes a base 164, a pair of inner roller supports 165, and a pair of outer roller supports 166. A respective bearing 167 is located at each end of the base 164.

The idler assemblies 161 are carried by the telescopic rails 132 such that the idler assemblies 161 are able to slide back and forth along the rails 132. In particular, with reference to FIG. 8, each end of each idler assembly base 164 is received by the aligned openings 136, 137 and channel 138 of each telescopic rail 132 such that the base 164 is able to slide along the openings 136, 137 and channel 138 of each rail 132.

Referring to FIG. 6, the idler assemblies 161 are connected together by connecting links 168 so that as either one of the assemblies 161 is moved along the rails 132 away from the other assembly 161, the other assembly 161 will follow.

The extendable support apparatus 116 also includes a length-adjusting means 170 which is operable to extend and retract the extendable frame 130 by extending and retracting the telescopic rails 132. The length-adjusting means 170 includes a respective hydraulic cylinder 171 secured to each telescopic rail 132. For clarity, the cylinders 171 have not been depicted in FIG. 7.

Extending the cylinders 171 extends the telescopic rails 132 so that the frame 130 is thereby extended. Retracting the cylinders retracts the telescopic rails 132 so that the extendable frame 130 is retracted.

With particular reference to FIG. 7, the extendable support apparatus 116 also includes a shifting means 172 which is operable to shift the apparatus 116 laterally. Shifting means 172 includes a respective pair of extendable arms or jacks 173 at each end of the base 150. The arms 173 at each end of the base 150 are able to be extended in opposite directions so that the shifting means 172 can shift the apparatus 116 from one side to the other. For example, if the apparatus 116 is located in a roadway in an underground mine, and it is desired to shift the apparatus 116 from one side of the roadway to the other side, one of the arms 173 at each end of the base 150 is extended so that each of the extended arms 173 push against a wall or rib of the roadway so that the apparatus 116 is thereby pushed in the desired direction. The apparatus 116 can be pushed or shifted in the other direction by retracting the extended arms 172, and extending the other arms 172 so that they push against an opposite wall or rib.

Figure 11:
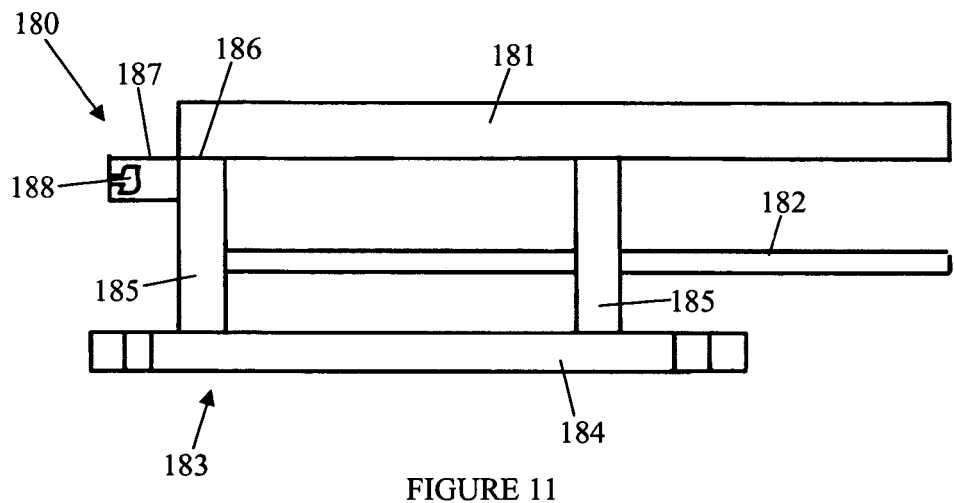
FIG. 11 is a side elevation of a conveyor belt lifter apparatus of the continuous haulage apparatus depicted in FIG. 5.

Referring to FIG. 11, the belt structure building, installation and extension station 119 includes a conveyor belt lifter apparatus 180 which includes a carry-side conveyor belt support 181 and a return-side conveyor belt support 182. Both supports 181, 182 are secured to a base 183 which includes one or more longitudinal members 184, and a plurality of leg members 185. A pivot 186 allows the support 181 to be pivoted relative to the base 183. The opposite end of the support 181 to the pivot 186 is able to be raised and lowered so that the support 181 is able to be pivoted about the pivot 186. Lifter apparatus 180 also includes a joint member 187 which includes a socket 188 so that the apparatus is able to be joined to the extendable support apparatus 116.

Figure 5:
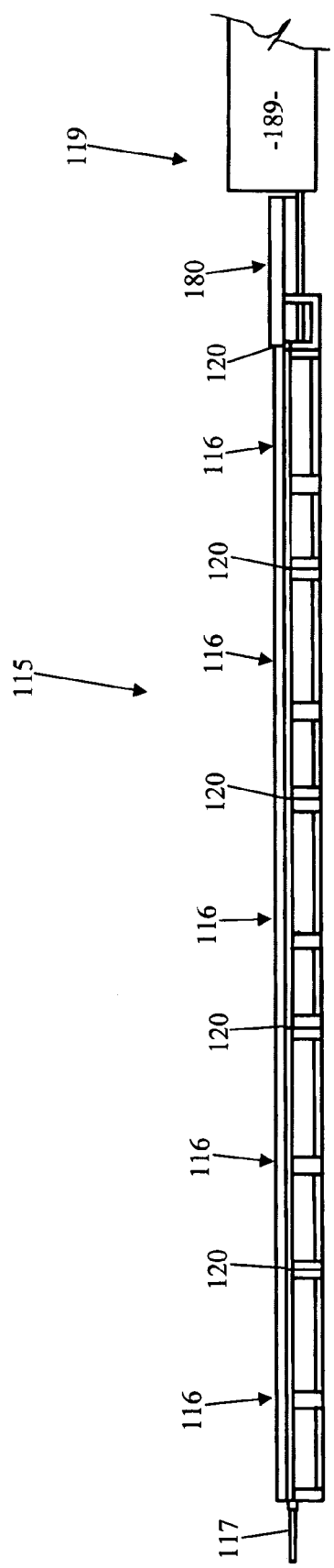
FIG. 5 is a side elevation of a portion of a first preferred embodiment of a continuous haulage apparatus according to the second aspect of the present invention.

Referring to FIG. 5, when the support 181 is raised, the support 181 supports the weight of the carry-side of the conveyor belt and lifts the belt off the belt conveyor 118 so that the conveyor 118 can be extended or retracted while the conveyor belt continues to circulate and haul coal.

The carry-side of the conveyor belt is contained and isolated in an enclosed structure. The return side of the conveyor is contained and isolated in an enclosed sheath. The station 119 includes guards 189 for this purpose so that no moving parts of the conveyor are exposed at the station 119. The guards 189 remain stationary and the vertical actuation of the carry-side of the belt by the support 181 occurs inside the width of the guarded area. An alternative construction is the application of a tripper structure that supports the conveyor belt by a series of trough rollers which in turn support the weight of the conveyor belt. This alternative construction allows the belt to be diverted vertically over a set of rollers, deflecting the belt over the working area of the station 119. No vertical lifting component is necessary for this option.

Figure 10:
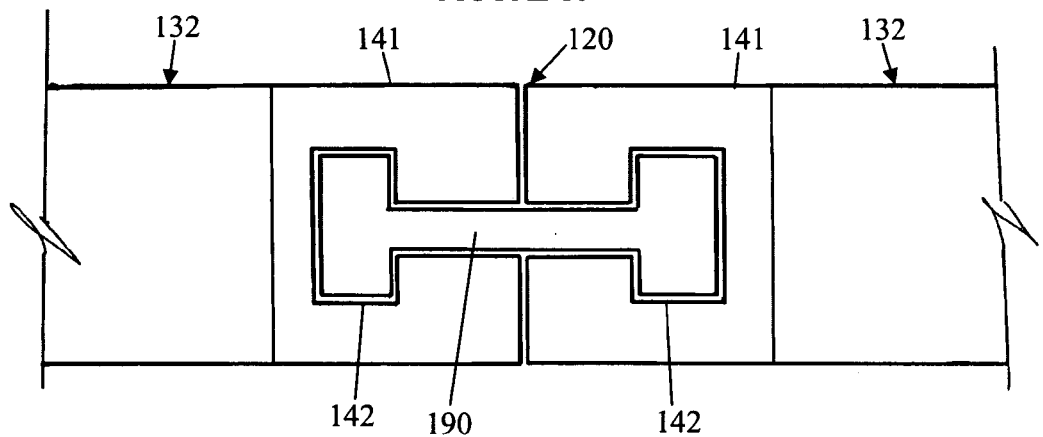
FIG. 10 is a side elevation of an articulated joint which joins together two extendable support apparatus of the continuous haulage apparatus depicted in FIG. 5.

With reference to FIG. 10, the adjacent extendable support apparatus 116 in the series 115 are joined together by linkages 190 which are received by the sockets 142 of the adjacent joining members 141 of the apparatus 116 to form the articulated joints 120. The belt lifter apparatus 180 is joined to the extendable support apparatus 116 in a similar manner. The articulated joints 120 enable the extendable support apparatus 116 and the belt lifter apparatus 180 to pivot relative to each other.

In operation, once each of the support apparatus 116 have been extended towards the coal face 112 as far as possible, the end of the support apparatus series 115 which is secured to the station 119 is retracted towards the coal face 112 so that a gap is formed between the station 119 and the end of the conveyor 118. The outbye end of the lifter apparatus 180 (i.e. the end of the lifter apparatus 180 which is closest to the conveyor 118) is elevated as previously explained so that the support 181 supports the weight of the conveyor belt and lifts the belt off the conveyor 118 so that the conveyor 118 can be extended towards the station 119.

FIGS. 12 and 13 depict an extendable support apparatus 200 for supporting the conveyor belt. Apparatus 200 may be used in place of apparatus 116 in the continuous haulage apparatus 113. Apparatus 200 includes an extendable frame 201 which includes a pair of laterally separated telescopic rails 202. Each rail 202 includes a first hollow segment 203, a second hollow segment 204 which is received by the first segment 203 such that the second segment 204 is able to be extended and retracted relative to the first segment 203, and a third hollow segment 205 which is received by the second segment 204 such that the third segment 205 is able to be extended and retracted relative to the second segment 204. An elongate opening 206 extends along the length of the second segment 204, and an elongate opening 207 extends along the length of the third segment 205. The elongate openings 206, 207 are aligned with each other.

Extendable frame 201 also includes a base 208 which includes a plurality of leg members 209 extending from the rails 202 such that one leg member 209 extends from the second segment 204 and the third segment 205 of each rail 202, and such that three leg members 209 extend from the first segment 203 of each rail 202. A respective longitudinal member 210 is secured to the leg members 209 which extend from the first segment 203 of each rail 202. Base 208 also includes a plurality of lateral members 211.

Apparatus 200 also includes a rest 220 for supporting the conveyor belt. Rest 220 includes a plurality of rotatable return idler rollers 221 which are secured relative to the first segment 203 of each rail 202. Return idler rollers 221 function to support the return-side of the conveyor belt.

Rest 220 also includes a plurality of idler assemblies 222 which are supported or carried by the first segment 203 of each rail 202. Idler assemblies 222 are fixed in position relative to the segments 203. Each idler assembly 222 includes an idler support frame 223, and a plurality of rotatable idler rollers 224 mounted on the frame 223. Idler rollers 224 are for supporting the carry-side of the conveyor belt.

A plurality of idler assemblies 225 are carried by the second segment 204 and also the third segment 205 of each rail 202. Each idler assembly 225 includes an idler support frame 226, a plurality of rotatable idler rollers 227 supported by the frame 226, and a rotatable idler roller 228 supported by the frame 226. Idler rollers 227 are for supporting the carry-side of the conveyor belt, and the idler roller 228 is for supporting the return-side of the conveyor belt.

The frame 226 of each idler roller assembly 225 which is carried by the second segment 205 of each rail 202 is received by the elongate opening 206 in each segment 205 such that the frame 226 is able to slide along the segments 205. Similarly, the frame 226 of each idler roller assembly 225 which is carried by the third segment 205 of each rail 202 is received by the elongate opening 207 in each segment 205 such that the frame 226 is able to slide along the segments 205.

All of the idler assemblies 225 which are carried by the second segments 204 are connected to each other in series by one or more connecting links (not depicted). The idler assembly 225 which is carried by the second segments 204 and which is closest to the first segments 203 is connected relative to the first segments 203 so that as the second segments 204 are extended from the first segments 203, the idler assemblies 225 move back along the second segments 204 towards the first segments 203. The idler assemblies 225 carried by the second segments 204 are spaced apart from each other as depicted in FIG. 12 once the second segments 204 have been fully extended relative to the first segments 203. When the second segments 204 are retracted into the first segments 203, the idler assemblies 225 carried on the second segments 204 are forced back towards the end of each second segment 204 which is distal to each of the first segments 203 as shown in FIG. 13.

Likewise, all of the idler assemblies 225 which are carried by the third segments 205 are connected to each other in series by one or more connecting links. The idler assembly 225 which is carried by the third segments 205 and which is closest to the second segments 204 is connected relative to the second segments 204 so that as the third segments 205 are extended relative to the second segments 204, the idler assemblies 225 move back along the third segments 205 towards the second segments 204. The idler assemblies 225 carried by the third segments 205 are spaced apart from each other as depicted in FIG. 12 once the third segments 205 have been fully extended relative to the second segments 204. When the third segments 205 are retracted into the second segments 204, the idler assemblies 225 carried by the third segments 205 are forced back towards the end of each third segment 205 which is distal to each of the second segments 204 as shown in FIG. 13.

Apparatus 200 also includes a shifting means 230 which comprises a plurality of extendable hydraulic or pneumatic cylinders 231. The cylinders 231 operate in a similar manner to the extendable arms 173 of the apparatus 116, and are able to laterally shift the apparatus 200 and then shift it back again.

Figure 14:
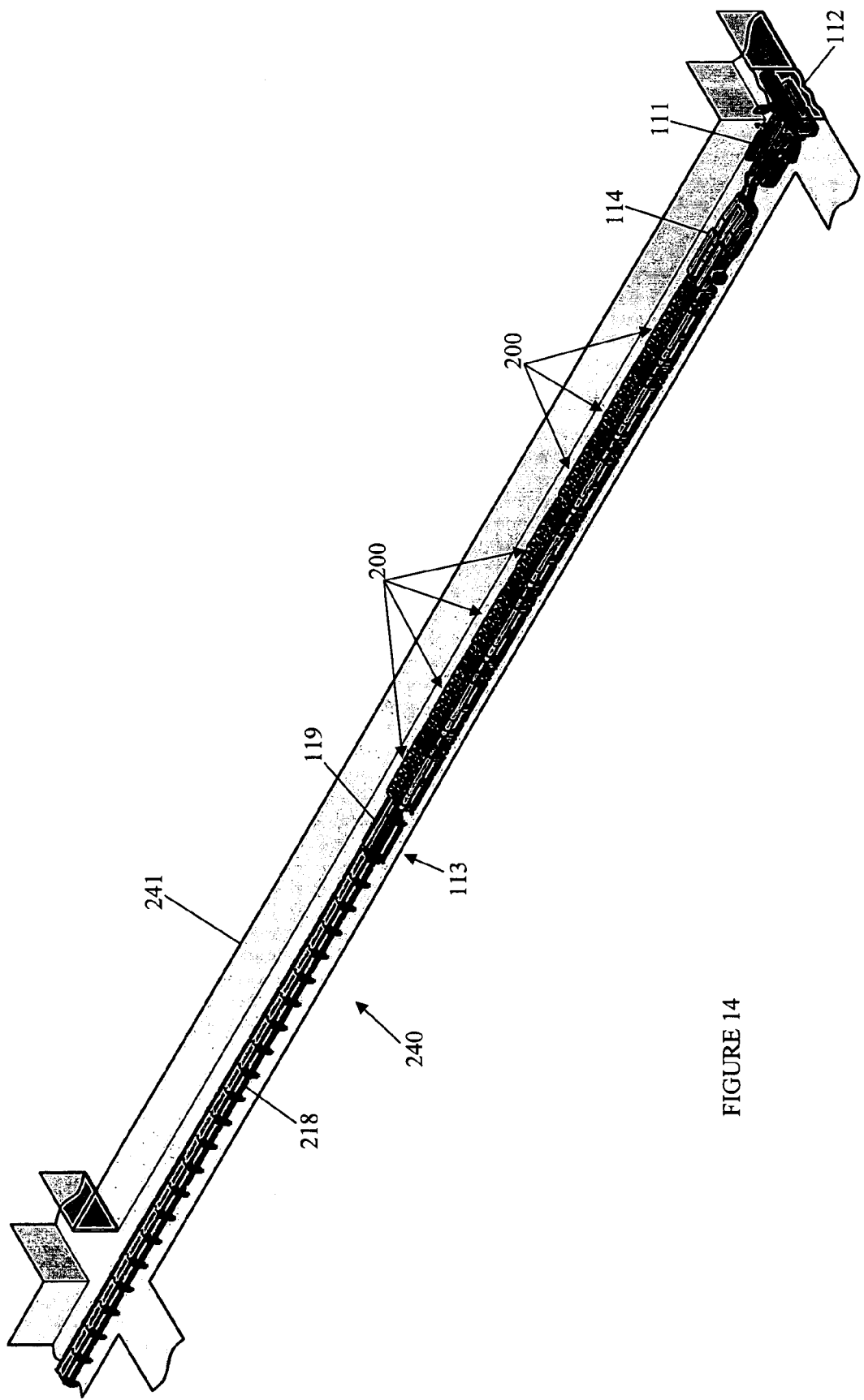
FIG. 14 is a perspective view of a development roadway of an underground room and pillar coal mine and an end portion of a second preferred embodiment of a mining apparatus according to the third aspect of the present invention when the apparatus is in an initial position.

Referring to FIG. 14, a mining apparatus 240 is depicted extending along a development roadway 241 in an underground room and pillar coal mine. Apparatus 240 is identical to the mining apparatus 110, except that apparatus 240 includes a series of extendable support apparatus 200 instead of a series of extendable support apparatus 116. For convenience, like features of the mining apparatus 110 and 240 have been referenced with like reference numbers.

FIG. 14 depicts the mining apparatus 240 when its continuous haulage apparatus 113 is in an initial startup position in which each extendable support apparatus 200 is in the fully retracted position.

Figure 15:
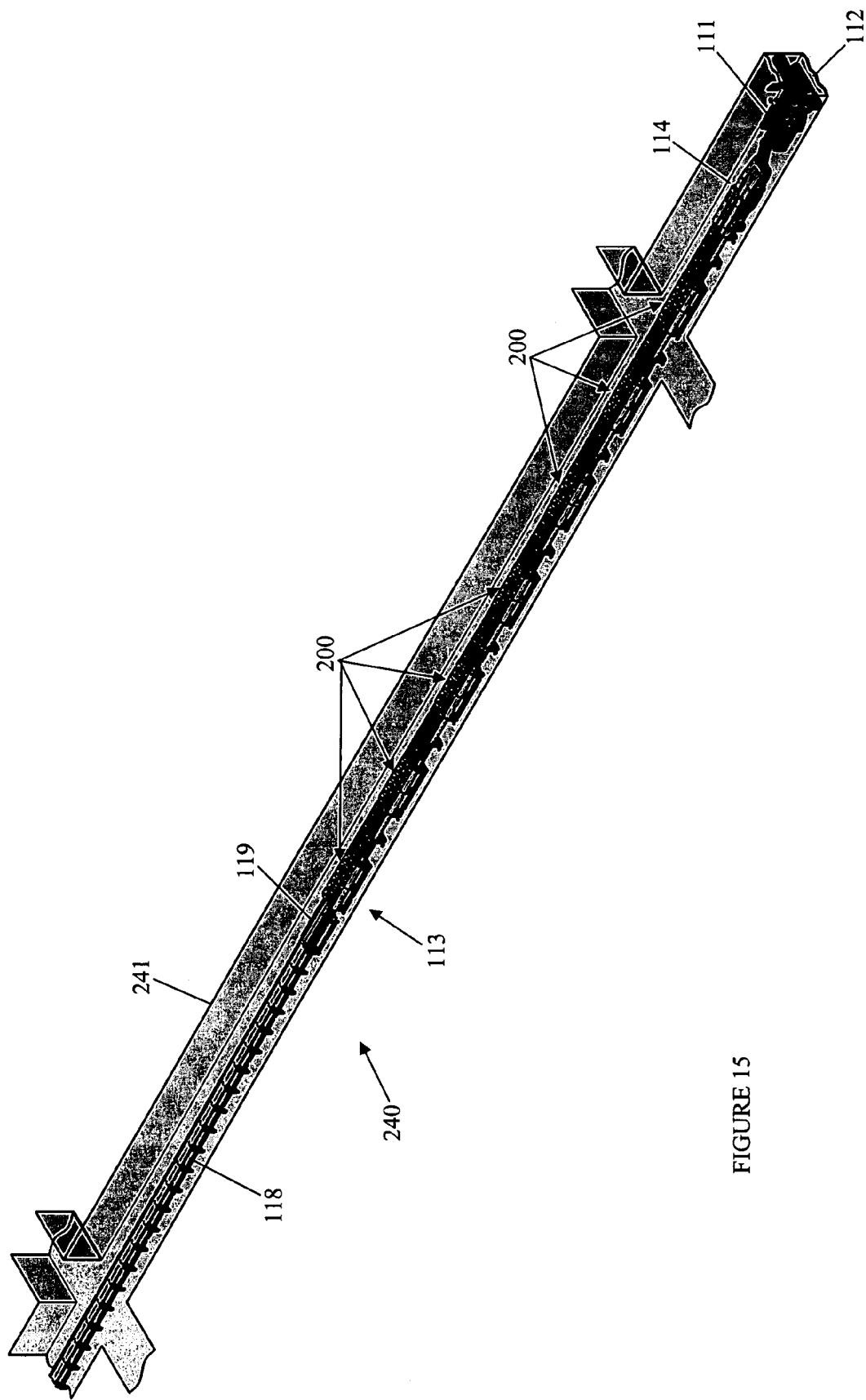
FIG. 15 depicts the development roadway and the mining and hauling apparatus illustrated in FIG. 14 after the apparatus has been used to develop the roadway by 30 meters.

FIG. 15 depicts the mining apparatus 240 and the roadway 241 after the roadway 241 has been developed by a distance of 30 meters from the startup position depicted in FIG. 14. As the continuous miner 111 and mobile boot end 114 advanced along the roadway 241, each extendable support apparatus 200 extended towards the coalface 112 so that coal mined by the miner 111 and transferred to the mobile boot end 114 is continuously hauled by the haulage apparatus 113 back along the roadway 241.

Figure 16:
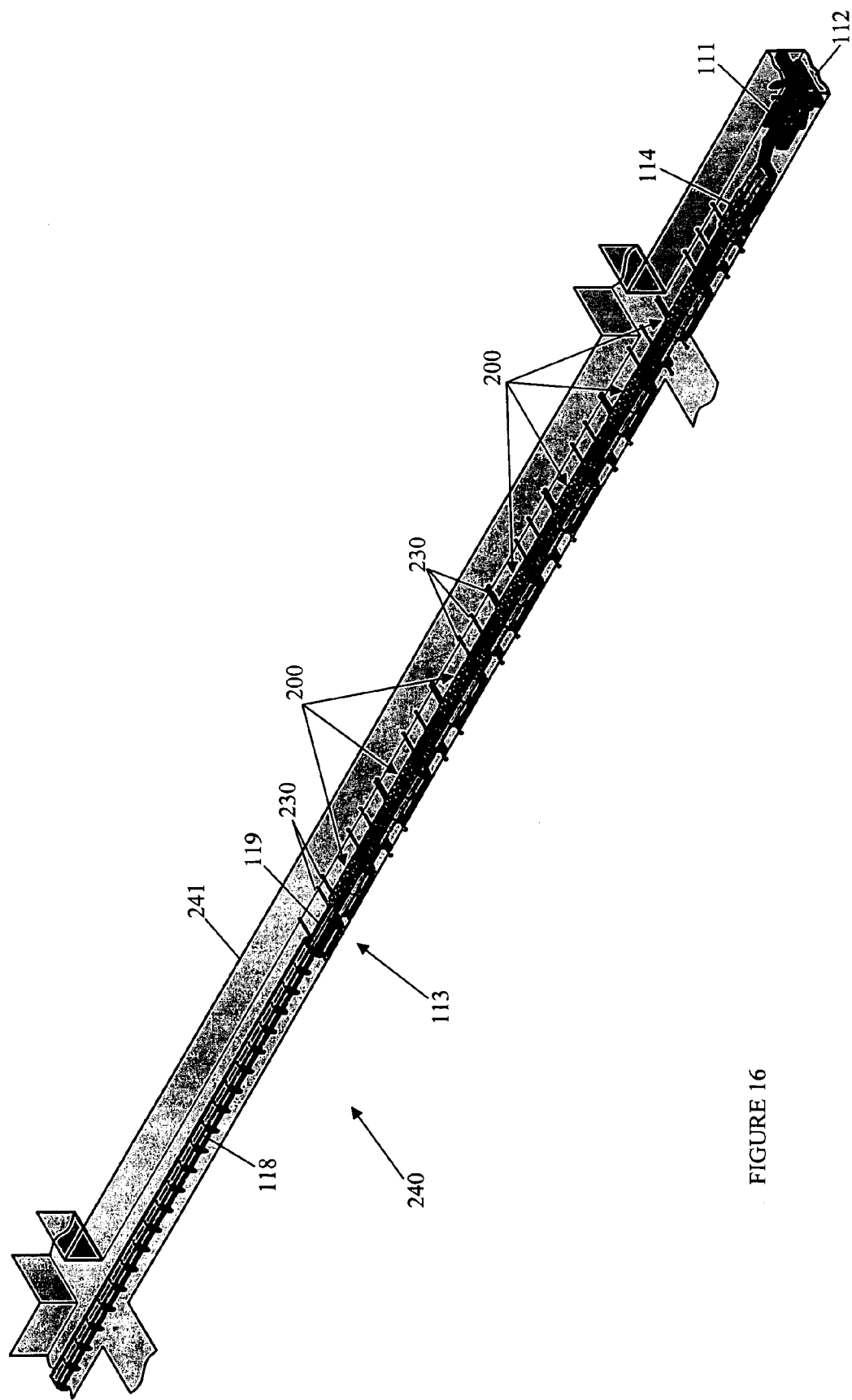
FIG. 16 depicts the development roadway and the mining apparatus illustrated in FIG. 15 after part of the apparatus has been shifted sideways in the development roadway.

Referring to FIG. 16, station 119, extendable support apparatus 200, and the mobile boot end 114 are shown after being shifted sideways in the roadway 241 by the extendable cylinders 231 of the extendable support apparatus 200. The cylinders 230 are shown whilst still in their extended position.

Figure 17:
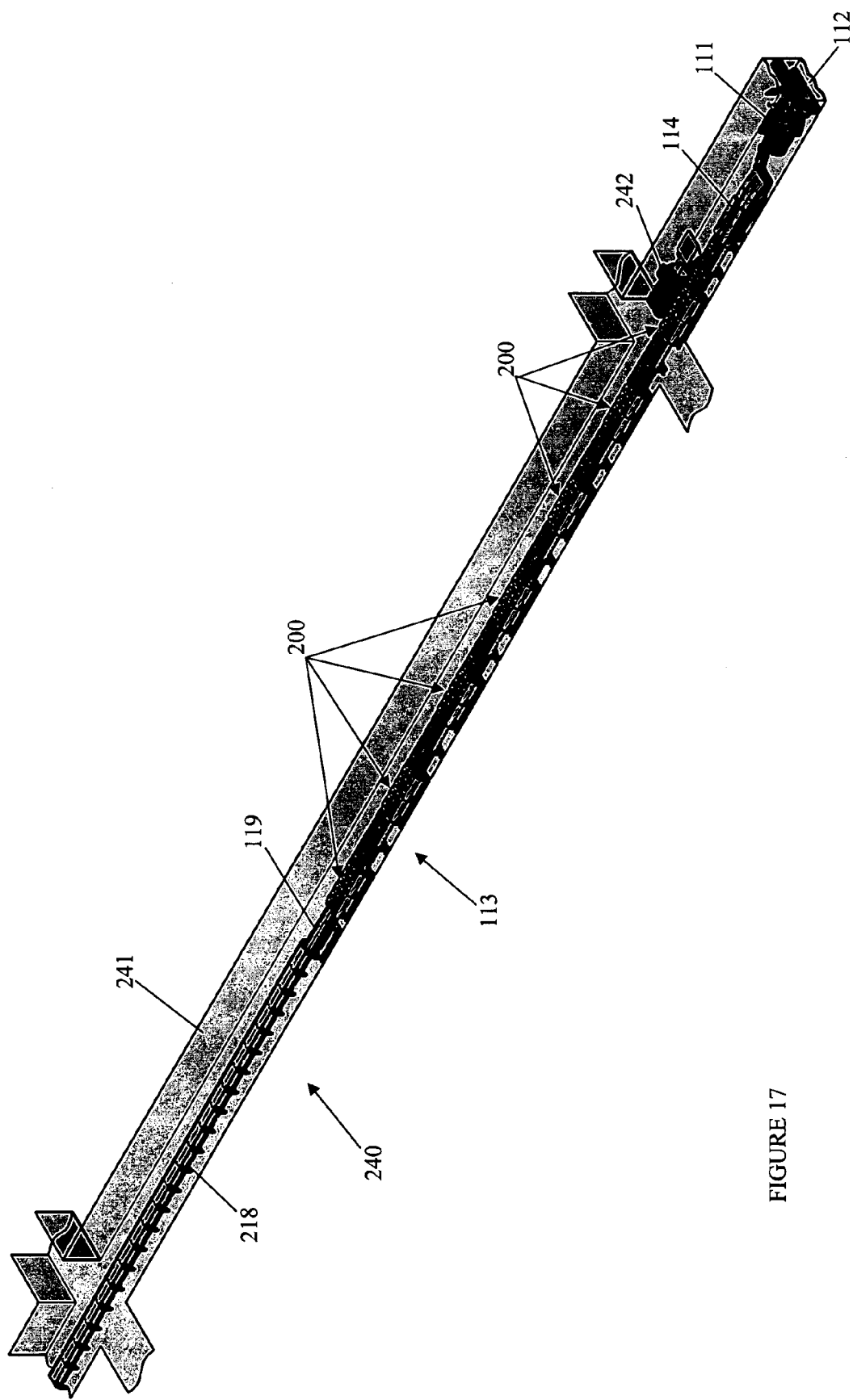
FIG. 17 depicts a front-end loader being driven along the development roadway beside the mining apparatus illustrated in FIG. 16.

FIG. 17 depicts the side-shifted station 119, extendable support apparatus 200, and mobile boot end 114 after the cylinders 230 have been retracted. Sufficient room has been created beside the apparatus 240 by the side-shift for a front-end loader 242 to drive alongside the shifted components of the apparatus 240 and towards the continuous miner 111. The continuous miner 111 is being supplied by the loader 242 for every 30 meters of the roadway 241 which the miner 111 develops.

Figure 18:
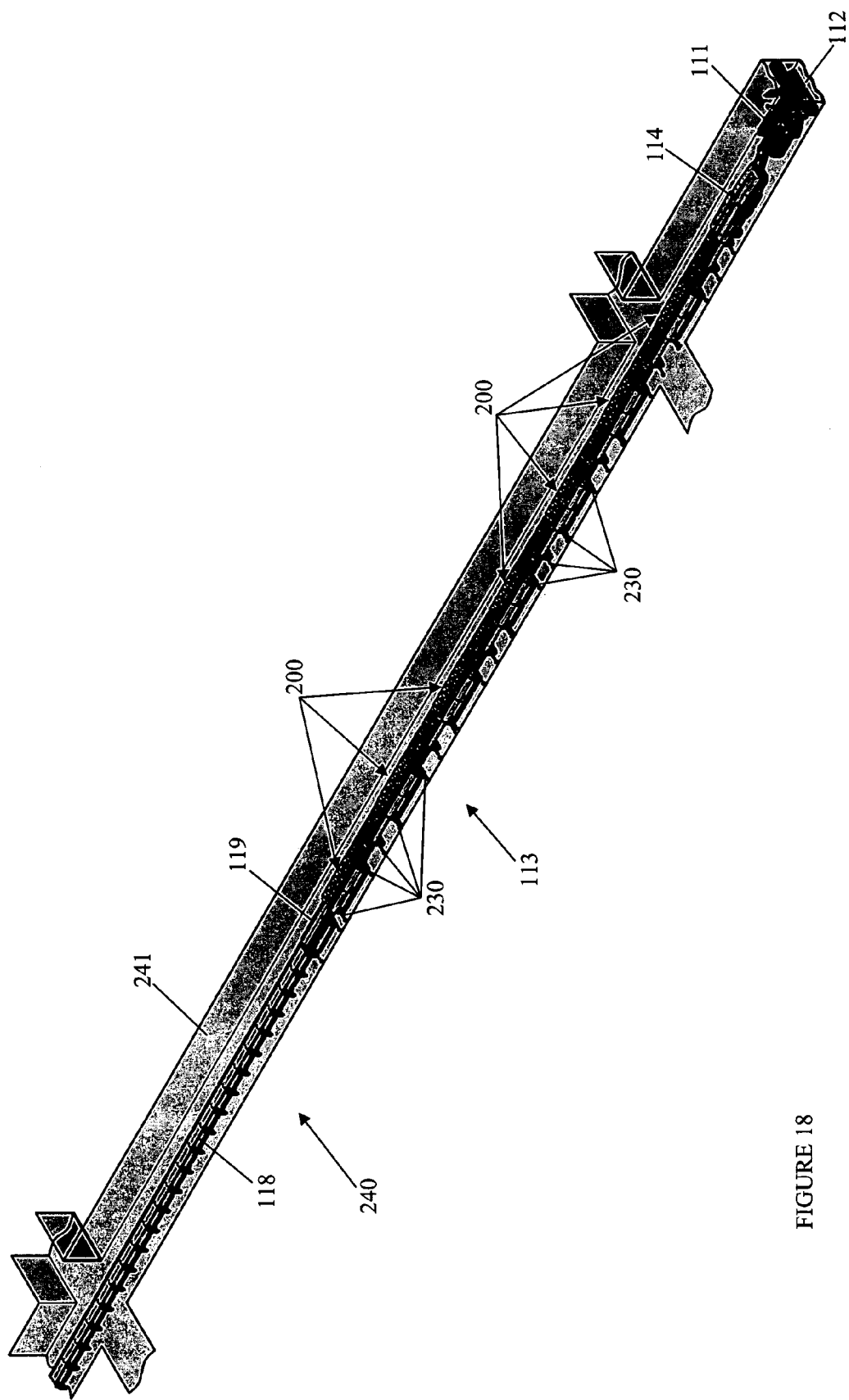
FIG. 18 depicts the mining apparatus illustrated in FIG. 14 after the shifted part of the apparatus has been shifted sideways back to its original lateral position on the development roadway.

Referring to FIG. 18, the station 119, extendable support apparatus 200, and the mobile boot end 114 are shown after being shifted sideways back to the position depicted in FIG. 15. The cylinders 230 are shown still in their extended position.

Figure 19:
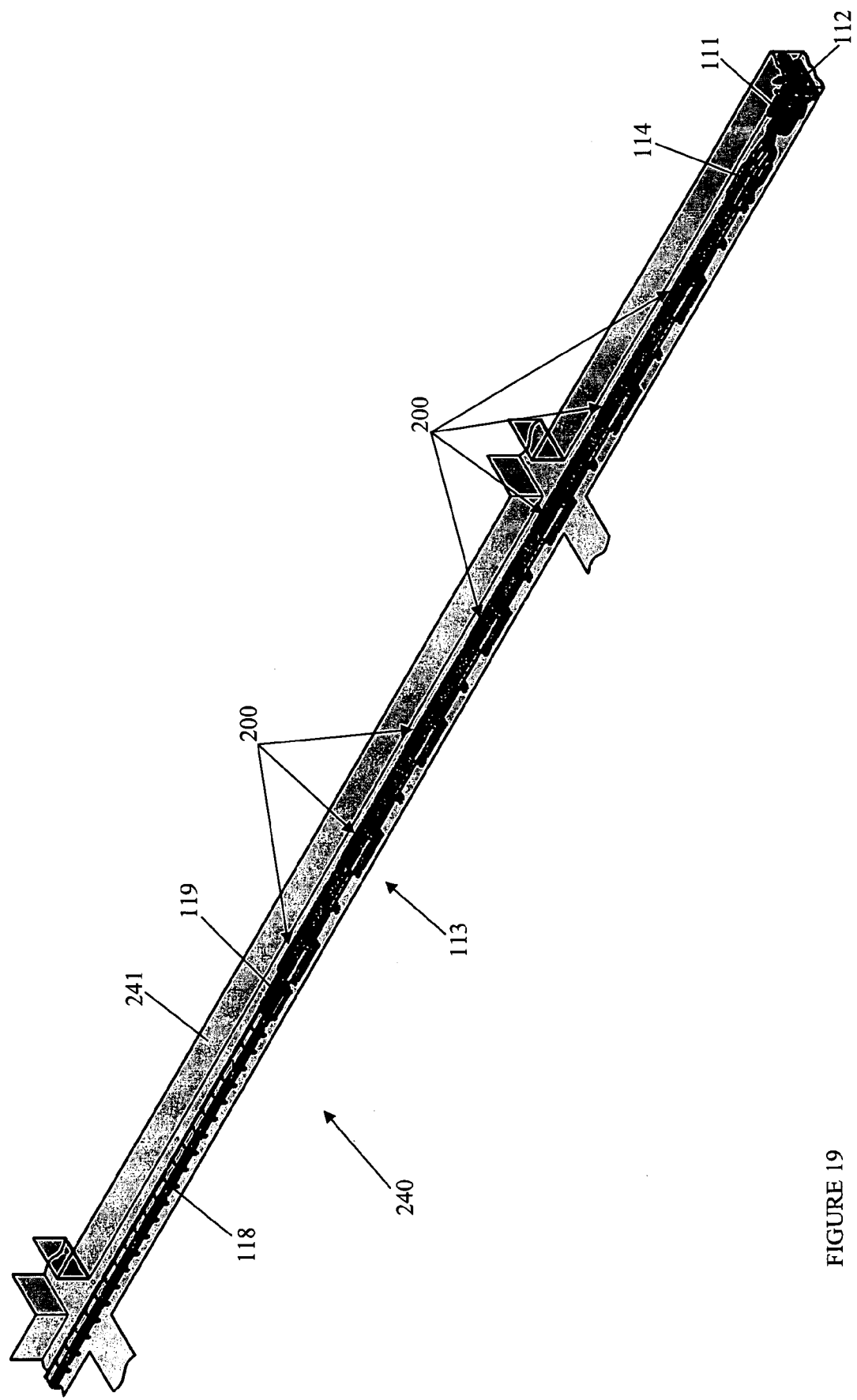
FIG. 19 depicts the development roadway and the mining apparatus illustrated in FIG. 18 after the apparatus has been used to develop the roadway by another 30 meters.

FIG. 19 depicts the mining apparatus 240 and the roadway 241 after the roadway 241 has been developed by another 30 meters. Each extendable support apparatus 200 is fully extended.

Figure 20:
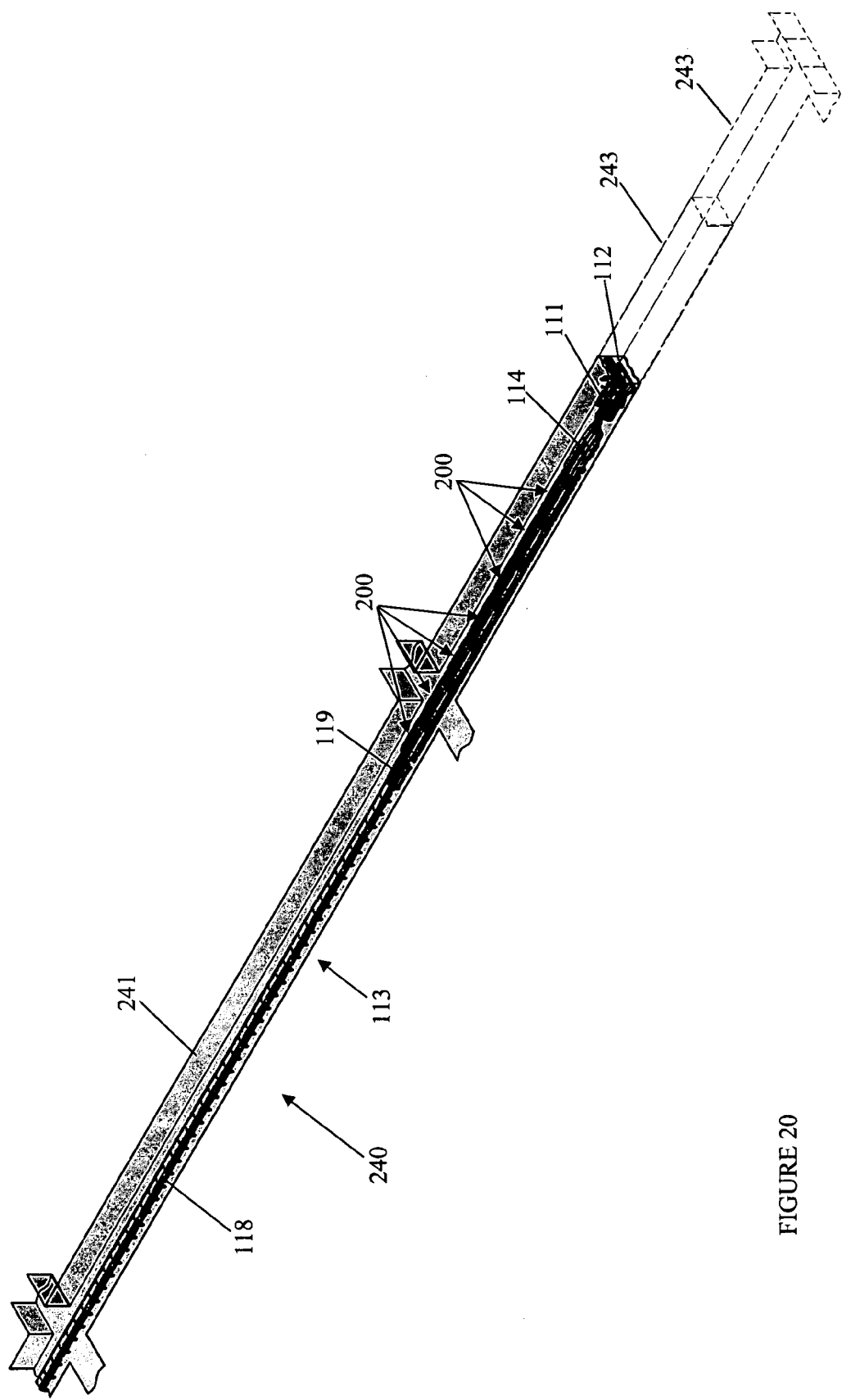
FIG. 20 depicts the development roadway and the mining apparatus illustrated in FIG. 19 after the belt conveyor of the apparatus has been extended further along the roadway and after the extendable support apparatus have been retracted.
Figures 21, 22:
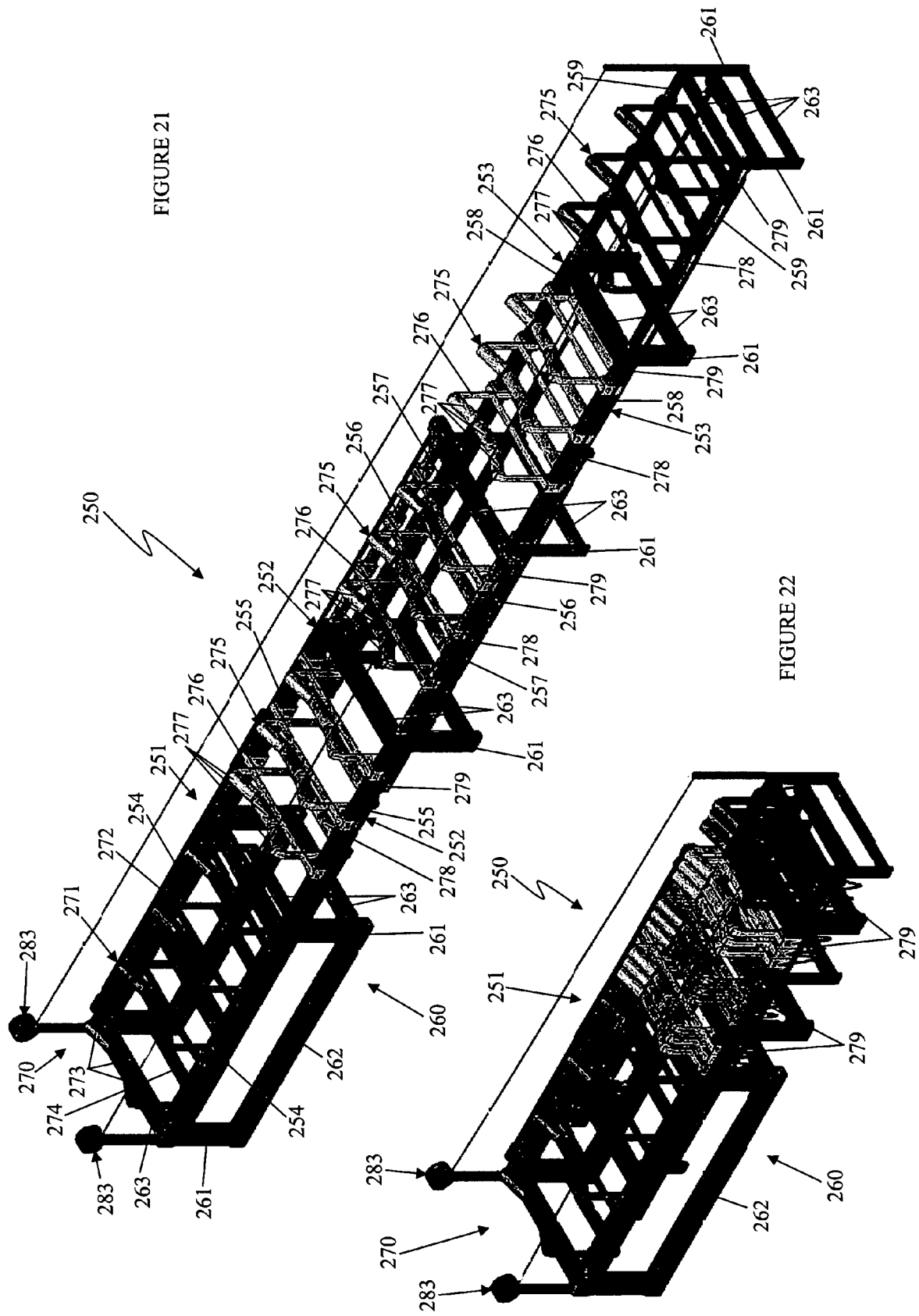
FIG. 21 is a perspective view of a third preferred embodiment of an extendable support apparatus according to the first aspect of the present invention when the apparatus is fully extended.
FIG. 22 is a perspective view of the extendable support apparatus depicted in FIG. 21 when the apparatus is fully retracted.

FIG. 20 depicts the mining apparatus 240 after the belt installation station 119 has been used to extend the length of the belt conveyor 118 towards the coalface 112. As the belt conveyor 118 is extended, each extendable support apparatus 200 is retracted so that the station 119 moves towards the mobile boot end 114. The continuous haulage apparatus 113 which includes the belt conveyor 118 is able to operate continuously, even while each extendable support apparatus 200 is being retracted and the belt conveyor 118 is being extended. Two future 30 meter development intervals 243 are depicted in phantom.

FIGS. 21 to 29 depict an extendable support apparatus 250 for supporting the conveyor belt. Apparatus 250 can be used in place of apparatus 116 or apparatus 200 in the continuous haulage apparatus 113. Apparatus 250 includes an extendable frame 251 which includes a first pair of laterally separated telescopic rails 252, and a second pair of laterally separated telescopic rails 253 secured to the first pair of rails 252.

Each telescopic rail 252 includes a first hollow segment 254, a second hollow segment 255 which is received by the first segment 254 such that the second segment 255 is able to be extended and retracted relative to the first segment 254, and a third hollow segment 256 which is received by the second segment 255 such that the third segment 256 is able to be extended and retracted relative to the second segment 255.

Each telescopic rail 253 includes a first hollow segment 257, a second hollow segment 258 which is received by the first segment 257 such that the second segment 258 is able to be extended and retracted relative to the first segment 257, and a third hollow segment 259 which is received by the second segment 258 such that the third segment 259 is able to be extended and retracted relative to the second segment 258.

The first segment 257 of each rail 253 is secured to the third segment 256 of a respective one of the rails 252 so that the rails 253 extend from the rails 252.

Extendable frame 251 also includes a base 260 which includes a plurality of leg members 261 extending from the rails 252, 253. A respective longitudinal member 262 is secured to the leg members 261 which extend from the first segment 254 of each rail 252. Base 260 also includes a plurality of lateral members 263.

Apparatus 250 also includes a rest 270 for supporting the conveyor belt. Rest 270 includes a plurality of idler assemblies 271 which are carried by and affixed in position to the first segment 254 of each rail 252. Each assembly 271 includes an idler support frame 272, a plurality of rotatable idler rollers 273 mounted on the frame 272, and a rotatable idler roller 274 mounted on the frame 272. Rollers 273 are for supporting the carry-side of the conveyor belt, and roller 274 is for supporting the return-side of the conveyor belt.

Rest 270 also includes a plurality of translatable idler assemblies 275 carried by the second and third segments 255, 256 of the first rails 252 and the second rails 253. Each idler assembly 275 includes an idler support frame 276 which is able to move along the outside of the rails 252, 253, a plurality of rotatable idler rollers 277 mounted on the frame 276, and a rotatable idler roller 278 mounted on the frame 276. Rollers 277 are for supporting the carry-side of the conveyor belt, and roller 278 is for supporting the return-side of the conveyor belt.

All of the idler assemblies 275 which are carried by the second segments 255 of the first rails 252 are connected to each other in series by connecting links 279. Respective connecting links 279 also connect the idler assemblies 275 which are carried by the other segments 256, 258, 259. Each connecting link 279 is secured relative to an adjacent segment so that as the apparatus 250 is extended, the links 279 cause the idler assemblies 275 to spread out along the segments 255, 256, 258, 259. When the apparatus 250 is retracted, the assemblies 275 are forced to move towards each other until they reach the positions depicted in FIG. 22.

Apparatus 250 also includes a length-adjusting means 280 for extending and retracting the rails 252, 253. Length-adjusting means 280 includes a pair of extendable cylinders 281 for extending and retracting the rails 252, and a pair of extendable cylinders 282 for extending and retracting the rails 253.

In addition, apparatus 250 includes a pair of lanyard emergency stop reels 283 which are secured relative to the first segments 254. An end of a lanyard 284 of each winch 283 is secured relative to the segments 259.

FIGS. 30 to 39 depict an extendable support apparatus 290 for supporting the conveyor belt. Like apparatus 250, the apparatus 290 can be used in place of apparatus 116 or apparatus 200 in the continuous haulage apparatus 113. Apparatus 290 is very similar to apparatus 250, and like reference numbers have been used to reference like features of the apparatus 250 and the apparatus 290.

Extension of the rails 252, 253 and, hence, the apparatus 290 can be achieved for example by coupling the apparatus 290 to a mobile boot end and then having the mobile boot end move away from the apparatus 290.

Apparatus 290 also includes a shifting means 291 which is operable to shift the apparatus 290 sideways similarly to the shifting means 230 of the apparatus 200. Shifting means 291 includes a plurality of rails 292 on which the leg members 261 rest such that the leg members 261 are able to slide back and forth along the rails 292.

Referring to FIG. 40, shifting means 291 also includes extendable cylinders 293 secured to the rails 292 and to at least some of the lateral members 263. Cylinders 293 can be extended and retracted so as to cause the leg members 261 and, hence, the apparatus 290 to move from side to side on the rails 292.

Apparatus 290 also includes a height-adjusting means 300 which is operable to both raise and lower the rails 252, 253 of the apparatus 290, and to keep the rails 252, 253 substantially level even when the ground on which the apparatus 290 rests is uneven or has a gradient. Height-adjusting means includes a plurality of extendable cylinders 301 in the legs 261 of the apparatus 290. Extension of the cylinders 301 raises the rails 252, 253, while retraction of the cylinders 301 lowers the rails 252, 253.

Apparatus 290 also includes a pair of articulated attachment links 294 for allowing a mobile boot end to draw the apparatus 290 behind it.

FIG. 40 depicts the apparatus 290 while the cylinders 293 are extended and while the cylinders 301 are retracted.

FIG. 41 depicts the apparatus 290 when the cylinders 301 are extended so that the rails 252, 253 are raised. Cylinders 293 have not been retracted so the lateral position of the apparatus 290 relative to the rails 292 is the same as that depicted in FIG. 40.

FIG. 42 depicts the apparatus 290 after the cylinders 293 have been partially retracted so that the apparatus 290 has been shifted laterally along the rails 292.

FIG. 43 depicts the apparatus 290 after the cylinders 293 have been fully retracted, and after the cylinders 301 have been fully retracted to lower the rails 252, 253.

FIG. 44 depicts the apparatus 290 after the cylinders 293 have been fully extended so that the apparatus 290 has been shifted back to the lateral position depicted in FIG. 40.

Figures 45, 46:
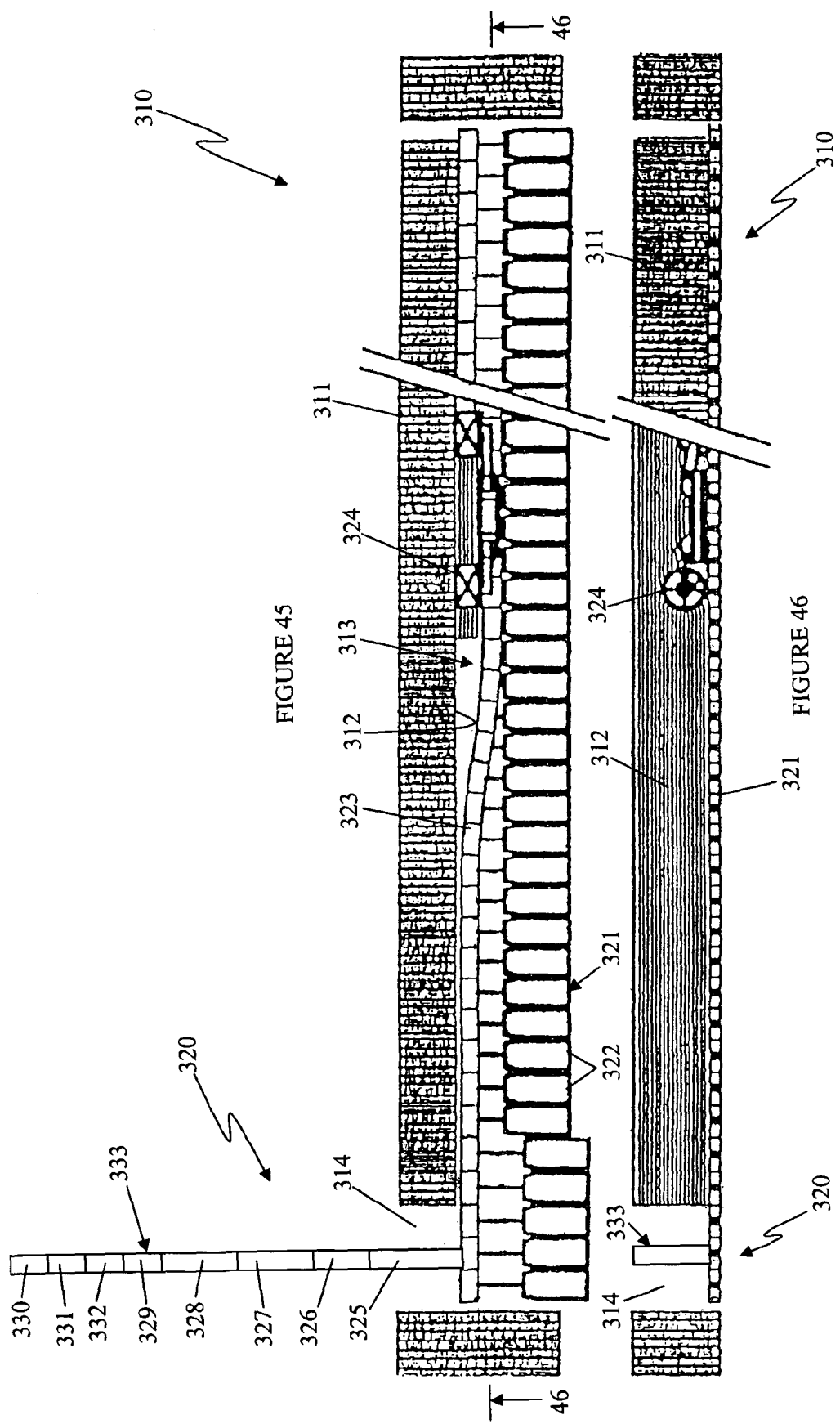
FIG. 45 is a plan view of an underground longwall coal mine and a second preferred embodiment of a mining apparatus according to the third aspect of the present invention.
FIG. 46 is a cross-sectional end elevation of the mining apparatus depicted in FIG. 45 taken along the line 46-46.

Referring to FIGS. 45 and 46, an underground longwall coal mine 310 includes a coal seam 311, a coal face 312, a cavity 313 in front of the coal face 312, and a roadway 314 leading from the cavity 313. A mining apparatus 320, which is located in the mine 310, is used to cut coal from the coal face 312 and to haul the cut coal away from the coalface 312.

Mining apparatus 320 includes a longwall machine 321 which is located in the cavity 313. Longwall machine 321 includes a plurality of moveable chocks or shields 322 for supporting the roof of the mine 310 and to protect the miners during the mining process. Located in front of the shields 322 are a conveyor 323 and a shearer 324. The shearer 324 moves along the coal face 312 from one side of the coal face 312 to the other. The shearer 324 cuts coal from the coal face 312 as it traverses across the coal face 312. The coal which is cut by the shearer 324 drops onto the conveyor 323, which hauls the coal towards the roadway 314. Once the coal reaches the roadway 314, it is transferred to a beam stage loader 325 which in turn transfers the coal to a mobile boot end 326 which stays in close proximity to the beam stage loader 325. The mobile boot end 326 is coupled to one or more extendable support apparatus 327. The extendable support apparatus 327 is coupled to a belt retraction station 328. A retractable belt conveyor 329 extends from the station 328. Conveyor 329 includes an endless conveyor belt which is supported by each extendable support apparatus 327. Conveyor 329 also includes a jib 330, a drive 331 for circulating the conveyor belt, and a loop take-up 332 for extending and retracting the conveyor belt in response to extension or retraction of the extendable support apparatus 327 and conveyor 329.

Each extendable support apparatus 327 may, for example, be one of the extendable support apparatus 116, 200, 250, 290 described previously.

The mobile boot end 326, extendable support apparatus 327, belt retraction station 328, and belt conveyor 329 together form a continuous haulage apparatus 333 of the mining apparatus 320.

After each pass of the shearer 324 across the coal face 311, the longwall machine 321 is advanced along the coal seam 311. When the longwall machine 321 advances along the coal seam 311, the continuous haulage apparatus 333 is retracted along the roadway 314. The continuous haulage apparatus 333 may be retracted by moving the mobile boot end 326 back along the roadway 314 by a sufficient amount, which in turn causes the extendable support apparatus 327 to retract. If the extendable support apparatus 327 is fully retracted, the belt retraction station 328 which is similar to the belt installation station 119, is used to retract the belt conveyor 329 so that a gap is formed between the station 328 and the conveyor 329. The extendable support apparatus 327 is then extended towards the conveyor 329 to close the gap. The continuous haulage apparatus 333 is able to haul coal continuously during the whole retraction process without any interruptions.

Throughout the specification and the claims, unless the context requires otherwise, the term "comprise", or variations such as "comprises" or "comprising", will be understood to apply the inclusion of the stated integer or group of integers but not the exclusion of any other integer or group of integers.

Throughout the specification and claims, unless the context requires otherwise, the term "substantially" or "about" will be understood to not be limited to the value for the range qualified by the terms.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

It will be clearly understood that, if a prior art publication is referred to herein, that reference does not constitute an admission that the publication forms part of the common general knowledge in the art in Australia or in any other country.

The invention claimed is:

1. A support apparatus for supporting an endless conveyor belt, the apparatus comprising
   a base frame and
   a length-adjustable frame including a plurality of segments which are able to be extended and/or retracted relative to each other, and
   wherein the length-adjustable frame, when extended, is supported above a ground surface, or between a ground surface and a roof, by the base frame and at least one leg and/or jack member mounted to the length-adjustable frame,
   the apparatus further including a rest for supporting the conveyor belt relative to the frames, the apparatus being able to be extended and/or retracted by sequentially extending and/or retracting the length-adjustable frame while the conveyor belt circulates relative to the apparatus and while the conveyor belt is supported by the rest.

2. The support apparatus of claim 1 further comprising a respective joining member at each end of the length-adjustable frame.

3. The support apparatus of claim 1 further comprising a length-adjusting means which is operable to extend and/or retract the length-adjustable frame.

4. The support apparatus of claim 1 further comprising a height-adjusting means which is operable to raise and lower the length-adjustable frame.

5. The support apparatus of claim 1 further comprising a shifting means which is operable to shift the apparatus laterally.

6. The support apparatus of claim 1, wherein the rest for supporting the conveyor belt includes a plurality of idlers.

7. The support apparatus of claim 6, wherein at least one of the idlers is fixed relative to the length-adjustable frame.

8. The support apparatus of claim 6, wherein at least one of the idlers is translatable relative to the length-adjustable frame.

9. The support apparatus of claim 8, wherein the translatable idlers are joined serially by at least one connecting link.

10. The support apparatus of claim 1, wherein the rest for supporting the conveyor belt includes a plurality of skid bars.

11. The support apparatus of claim 10, wherein at least one of the skid bars is fixed relative to the length-adjustable frame.

12. The support apparatus of claim 10, wherein at least one of the skid bars is translatable relative to the length-adjustable frame.

13. A continuous haulage apparatus comprising at least one of the support apparatuses of claim 1, an endless conveyor belt supported by each support apparatus, a drive for circulating the conveyor belt relative to each support apparatus, and a loop take-up for extending and/or retracting the conveyor belt in response to the at least one support apparatus being respectively extended and/or retracted.

14. The continuous haulage apparatus of claim 13 further comprising a belt conveyor which includes the conveyor belt.

15. The continuous haulage apparatus of claim 14 further comprising an apparatus for extending and/or retracting the belt conveyor.

16. The continuous haulage apparatus of claim 13 further comprising a fixed boot end or a mobile boot end.

17. A mining apparatus comprising a mining machine for mining material, and the continuous haulage apparatus of claim 13 for hauling the mined material.

18. The mining apparatus of claim 17, wherein the mining machine is a continuous miner.

19. The mining apparatus of claim 17, wherein the mining machine is a longwall machine.

20. A continuous haulage apparatus comprising at least one of the support apparatuses of claim 1, and a belt conveyor extension and/or retraction station for use with the support apparatus.

* * * * *